United States Patent
Okamoto et al.

(10) Patent No.: US 11,151,458 B2
(45) Date of Patent: Oct. 19, 2021

(54) APPARATUS AND METHOD FOR GENERATING IMAGE PROCESSING PROGRAM USING GENETIC PROGRAMMING

(71) Applicant: FUJITSU LIMITED, Kawasaki (JP)

(72) Inventors: Hiroaki Okamoto, Atsugi (JP); Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 771 days.

(21) Appl. No.: 15/939,588

(22) Filed: Mar. 29, 2018

(65) Prior Publication Data

US 2018/0218263 A1     Aug. 2, 2018

Related U.S. Application Data

(63) Continuation of application No. PCT/JP2015/078084, filed on Oct. 2, 2015.

(51) Int. Cl.
  *G06N 3/12*     (2006.01)
  *G06T 1/20*     (2006.01)

(52) U.S. Cl.
  CPC ............. *G06N 3/126* (2013.01); *G06T 1/20* (2013.01)

(58) Field of Classification Search
  CPC ............. G06N 3/12; G06N 3/126; G06T 1/20
  See application file for complete search history.

(56) References Cited

U.S. PATENT DOCUMENTS

| 6,052,678 | A | * | 4/2000 | Itoh | G06N 5/003 706/13 |
| 2004/0167721 | A1 | * | 8/2004 | Murakawa | G06N 3/126 702/20 |
| 2016/0098615 | A1 | | 4/2016 | Nagato et al. | |

FOREIGN PATENT DOCUMENTS

| JP | 6-119176 | 4/1994 |
| JP | 7-225752 | 8/1995 |
| JP | 9-114797 | 5/1997 |
| JP | 9-179845 | 7/1997 |
| JP | 9-251446 | 9/1997 |

(Continued)

OTHER PUBLICATIONS

Srinivas et a;. "Genetic Algorithms: Survey", IEEE, 1994, pp. 17-26.*

(Continued)

*Primary Examiner* — Li Wu Chang
(74) *Attorney, Agent, or Firm* — Staas & Halsey LLP

(57) ABSTRACT

In a program generation apparatus, an operating unit repeatedly performs setting process of calculating the increasing rate of the maximum fitness level among the fitness levels of individuals included in a population, setting a setting value indicating the number of child individuals to be generated to a first value if the increasing rate is higher than or equal to a first threshold and setting the setting value to a second value greater than the first value if the increasing rate is lower than the first threshold, an evolution process of generating as many child individuals as specified by the setting value, based on a parent individual selected from the individuals included in the population, and a survival selection process of selecting an individual with the highest fitness level from the parent and child individuals and replacing one of the individuals in the population with the selected individual.

10 Claims, 19 Drawing Sheets

(56) References Cited

FOREIGN PATENT DOCUMENTS

JP        2008-117059        5/2008
WO        2015/001967 A1     1/2015

OTHER PUBLICATIONS

Shinya Aoki et al., "ACTIT: Automatic Construction of Tree-structural Image Transformations", The Journal of The Institute of Image Information and Television Engineers, vol. 53, No. 6, Jun. 20, 1999, pp. 888-894.
Kengo Yoshii et al., "Discussion of Parallel Model of Multi-objective Genetic Algorithms on Heterogeneous Computational Resources", Transactions of Information Processing Society of Japan, vol. 48, No. SIG 15 (TOM 18), Oct. 2007, pp. 103-117.
International Search Report dated Dec. 28, 2015 in corresponding International Patent Application No. PCT/JP2015/078084.
Japanese Platform for Patent Information English abstract for Japanese Patent Publication No. 2008-117059, published May 22, 2008.
Japanese Platform for Patent Information English abstract for Japanese Patent Publication No. 9-179845, published Jul. 11, 1997.
Japanese Platform for Patent Information English abstract for Japanese Patent Publication No. 9-251446, published Sep. 22, 1997.
Japanese Platform for Patent Information English abstract for Japanese Patent Publication No. 6-119176, published Apr. 28, 1994.
Japanese Platform for Patent Information English abstract for Japanese Patent Publication No. 9-114797, published May 2, 1997.
Japanese Platform for Patent Information English abstract for Japanese Patent Publication No. 7-225752, published Aug. 22, 1995.

\* cited by examiner

A SMALL NUMBER OF CHILD INDIVIDUALS ARE GENERATED

A LARGE NUMBER OF CHILD INDIVIDUALS ARE GENERATED

A SMALL NUMBER OF INDIVIDUALS IN POPULATION

A LARGE NUMBER OF INDIVIDUALS IN POPULATION

APPARATUS AND METHOD FOR GENERATING IMAGE PROCESSING PROGRAM USING GENETIC PROGRAMMING

CROSS-REFERENCE TO RELATED APPLICATION

This application is a continuation application of International Application PCT/JP2015/078084 filed on Oct. 2, 2015 which designated the U.S., the entire contents of which are incorporated herein by reference.

FIELD

The embodiments discussed herein relate to a program generation apparatus and a program generation method.

BACKGROUND

Attention has been given to a technique of automatically generating an image processing program that performs desired image processing, using genetic programming. This technique optimizes the image processing program, which is a combination of partial programs (for example, image filter programs) for image processing, using input images and their corresponding processing results (i.e., target images) by means of genetic programming.

In addition, as an example of a technique of searching for an optimal solution in accordance with a genetic algorithm, there has been proposed a computing apparatus that monitors the increasing rate of the evaluation value of found solution, and when determining that the search in a certain search state decreases its effect, transitions to another search state. Moreover, as an example of a technique of achieving rule learning through fuzzy inference in accordance with a genetic algorithm, there has been proposed a fuzzy inference apparatus that changes the number of new rules to be generated, according to the number of individuals in a previous generation.

Please see, for example the following documents:
Japanese Laid-open Patent Publication No. 07-225752.
Japanese Laid-open Patent Publication No. 06-119176.
Shinya Aoki and Tomoharu Nagao, "ACTIT: Automatic Construction of Tree-structural Image Transformations," The Journal of the Institute of Image Information and Television Engineers, Vol. 53, No. 6, Jun. 20, 1999, pp. 888-894.

In generating an image processing program using genetic programming, the same number of child individuals are normally generated from parent individuals in all generations. If a small number of child individuals are to be generated, a search area at each generation is narrow in a solution search space. Therefore, the fitness levels of the child individuals are not likely to increase, and the learning progress rate may decrease accordingly. If a large number of child individuals are to be generated, the search area widens, so that the fitness levels of the child individuals are likely to increase at each generation. However, the number of calculations regarding the fitness levels increases with generation, and the learning time per generation lengthens accordingly. That is to say, to increase the number of child individuals to be generated does not always lead to reducing the time taken to generate a program.

SUMMARY

According to one aspect, there is provided a program generation apparatus using genetic programming, the program generation apparatus including: a memory configured to store therein information on a population including a plurality of individuals and a fitness level of each of the plurality of individuals included in the population, the plurality of individuals each being an image processing program that is represented by a tree structure; and a processor configured to perform a procedure including: a setting process of calculating an increasing rate of a maximum fitness level among fitness levels of the plurality of individuals included in the population, setting a setting value to a first value when the increasing rate is higher than or equal to a first threshold, and setting the setting value to a second value when the increasing rate is lower than the first threshold, the setting value indicating a number of child individuals to be generated, the second value being greater than the first value, an evolution process of generating as many child individuals as specified by the setting value, based on a parent individual selected from the plurality of individuals included in the population, and a survival selection process of obtaining a fitness level of the parent individual from the memory, calculating a fitness level of each of the child individuals, selecting an individual with a highest fitness level from the parent individual and the child individuals, replacing one of the plurality of individuals included in the population with the selected individual, and registering the fitness level of the selected individual in the memory, wherein the setting process, the evolution process, and the survival selection process are repeatedly performed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
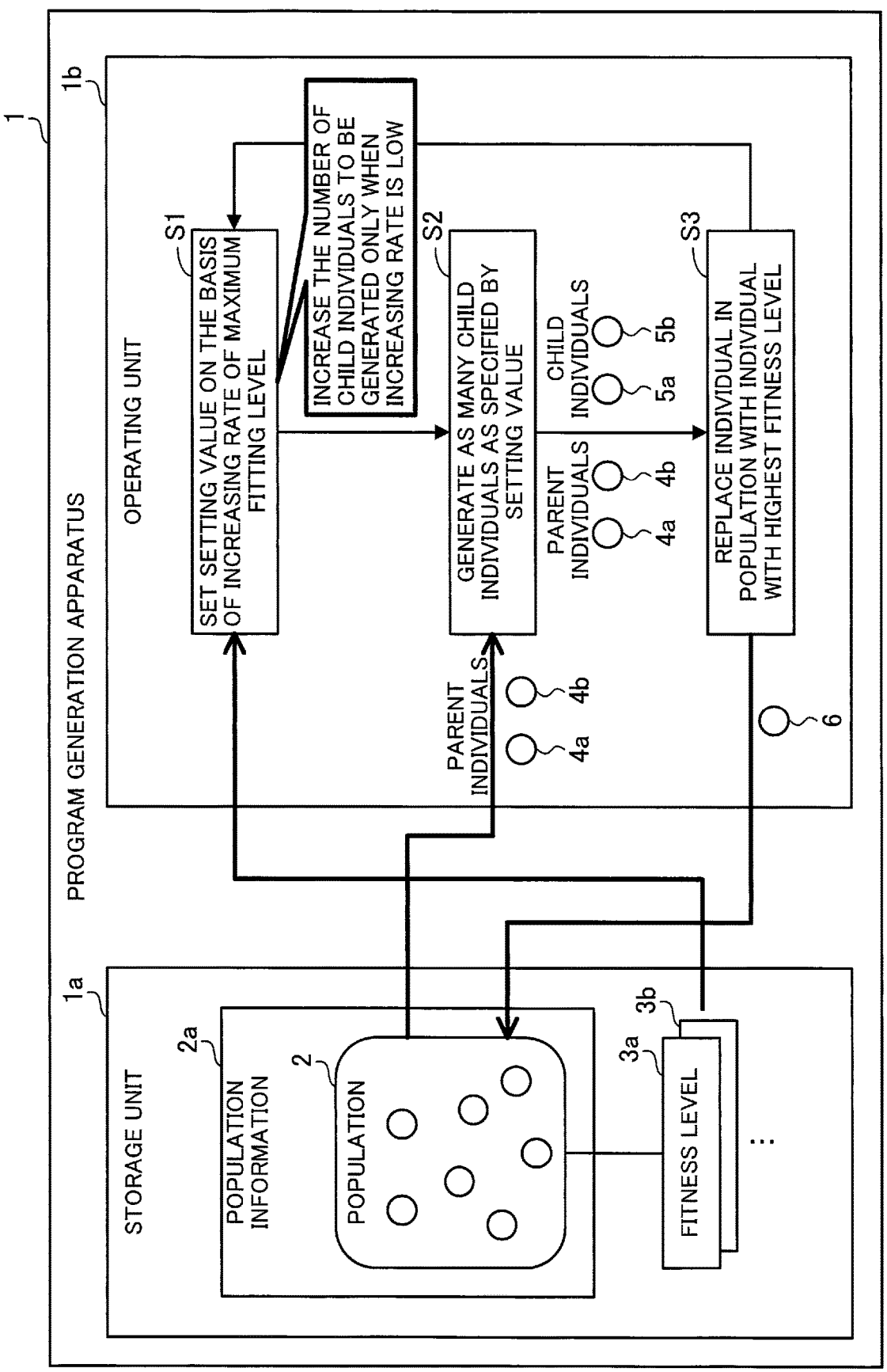
FIG. 1 illustrates an example of a configuration and processing of a program generation apparatus according to a first embodiment.

Several embodiments will be described below with reference to the accompanying drawings, wherein like reference characters refer to like elements throughout.

First Embodiment

FIG. 1 illustrates an example of a configuration and processing of a program generation apparatus according to a first embodiment. The program generation apparatus 1 of the first embodiment is configured to generate an image processing program using genetic programming. This program generation apparatus 1 includes a storage unit 1a and an operating unit 1b. For example, the storage unit 1a is implemented as a volatile storage device, such as a Random Access Memory (RAM), or a non-volatile storage device, such as a Hard Disk Drive (HDD) or flash memory. The operating unit 1b is a processor, for example.

The storage unit 1a stores therein population information 2a on a population 2 including a plurality of individuals. Each of the individuals in the population 2 is an image processing program, which is represented by a tree structure. In addition, the storage unit 1a stores therein fitness levels 3a, 3b, . . . calculated for the respective individuals included in the population 2.

Some or all of the individuals in the population 2 are updated by the operating unit 1b, as will be described later. When an individual in the population 2 is updated, the fitness levels stored in the storage unit 1a are updated accordingly, based on the fitness level of the updated individual.

The operating unit 1b repeatedly performs a setting process (step S1), an evolution process (step S2), and a survival selection process (step S3).

The setting process in step S1 is performed as follows. The operating unit 1b calculates the increasing rate of the maximum fitness level among the fitness levels 3a, 3b, . . . of the individuals included in the population 2. For example, the operating unit 1b calculates the increasing rate of the maximum fitness level over a period during which the population 2 is updated a prescribed number of times prior to the current time.

The operating unit 1b sets a setting value indicating the number of individuals to be generated at step S2, on the basis of the calculated increasing rate. More specifically, the operating unit 1b sets the setting value to P1 if the increasing rate is higher than or equal to a prescribed threshold Th1. The operating unit 1b sets the setting value to P2 that is greater than P1 if the increasing rate is lower than the threshold Th1.

Next, the evolution process in step S2 is performed as follows. The operating unit 1b generates as many child individuals as specified by the setting value set at step S1, from parent individuals 4a and 4b that are selected from the individuals included in the population 2. Referring to the example of FIG. 1, two child individuals 5a and 5b are generated. In this connection, a predetermined number of parent individuals are selected as parent individuals. These parent individuals may be selected by the operating unit 1b at certain timing during the period from the start of step S1 to the generation of the child individuals at step S2.

Then, the survival selection process in step S3 is performed as follows. The operating unit 1b obtains the fitness levels of the parent individuals 4a and 4b from the storage unit 1a. In addition, the operating unit 1b calculates the fitness level of each of the child individuals 5a and 5b generated at step S2. For example, in the case where an input image and a target image to be obtained by performing image processing on the input image are prepared in advance, the fitness level of an individual is calculated as follows. The operating unit 1b performs image processing on the input image by executing an image processing program corresponding to the individual. The operating unit 1b then compares the image obtained by the image processing with the target image and calculates the degree of similarity between these images as the fitness level.

Then, the operating unit 1b selects an individual 6 with the highest fitness level from the parent individuals 4a and 4b and the child individuals 5a and 5b. For example, if the fitness level of the selected individual 6 is higher than a prescribed threshold Th2, the operating unit 1b outputs the individual 6 as a final image processing program. On the other hand, if the fitness level of the individual 6 is lower than or equal to the threshold Th2, the operating unit 1b replaces one individual included in the population 2 with the selected individual 6. For example, the operating unit 1b removes either one of the parent individuals 4a and 4b from the population 2 and includes the selected individual 6 in the population 2, thereby updating the population 2. In addition, the fitness levels stored in the storage unit 1a are updated based on the fitness level of the individual 6.

After that, the processing returns back to step S1, where the increasing rate of the maximum fitness level among the fitness levels of the individuals included in the updated population 2 is calculated and the setting value is set according to the calculated increasing rate of the maximum fitness level.

As described above, the program generation apparatus 1 changes the number of child individuals to be generated, on the basis of the increasing rate of the maximum fitness level among the fitness levels of the individuals included in the population 2. If the increasing rate is higher than or equal to the threshold Th1, the program generation apparatus 1 sets the number of child individuals to be generated to be as small as P1. By doing so, it is possible to reduce the number of calculations regarding the fitness levels of child individuals at step S3, and to reduce the processing time per generation while keeping the increasing rate at a certain level or higher.

If the increasing rate is lower than the threshold Th1, the number of child individuals to be generated is increased from P1 to P2. Since more child individuals are generated, the search area in the solution search space widens. Thus, the highest value of the fitness levels of the generated child individuals is probably increased. In addition, the population 2 is updated with a child individual with the highest value of fitness level, which raises the possibility of improving the increasing rate of the maximum fitness level among the fitness levels of the individuals included in the population 2.

Note that, when the number of child individuals to be generated is increased, the number of calculations regarding the fitness levels of the child individuals at step S3 increases accordingly, so that the processing time per generation lengthens. For this reason, it is not preferable to keep the increased number of child individuals to be generated for a long time to increase the maximum fitness level, because this results in a longer time to generate a program.

By contrast, the above-described program generation apparatus 1 temporarily increases the number of child individuals to be generated, only during periods when the increasing rate of the maximum fitness level is low. That is, only during minimum periods, the number of child individuals to be generated is increased, and the number of calculations regrading fitness level increases with generation. By doing so, as a whole, it is possible to keep the increasing rate of the maximum fitness level at a certain level while minimizing the number of calculations regarding the fitness levels of child individuals, and thus to reduce the time taken to generate a program.

Second Embodiment

The following describes an image processing apparatus according to a second embodiment. The image processing apparatus of the second embodiment has the same processing functions as the program generation apparatus 1 illustrated in FIG. 1 and a function of performing image processing by executing an image processing program generated by the processing functions.

First, a comparative example as to a process of generating an image processing program using genetic programming will be described with reference to FIGS. 2 to 4. Next, a problem with this comparative example will be described with reference to FIGS. 5A and 5B. Then, the image processing apparatus of the second embodiment will be described in detail.

(Comparative Example as to Process of Generating Image Processing Program)

Figure 2:
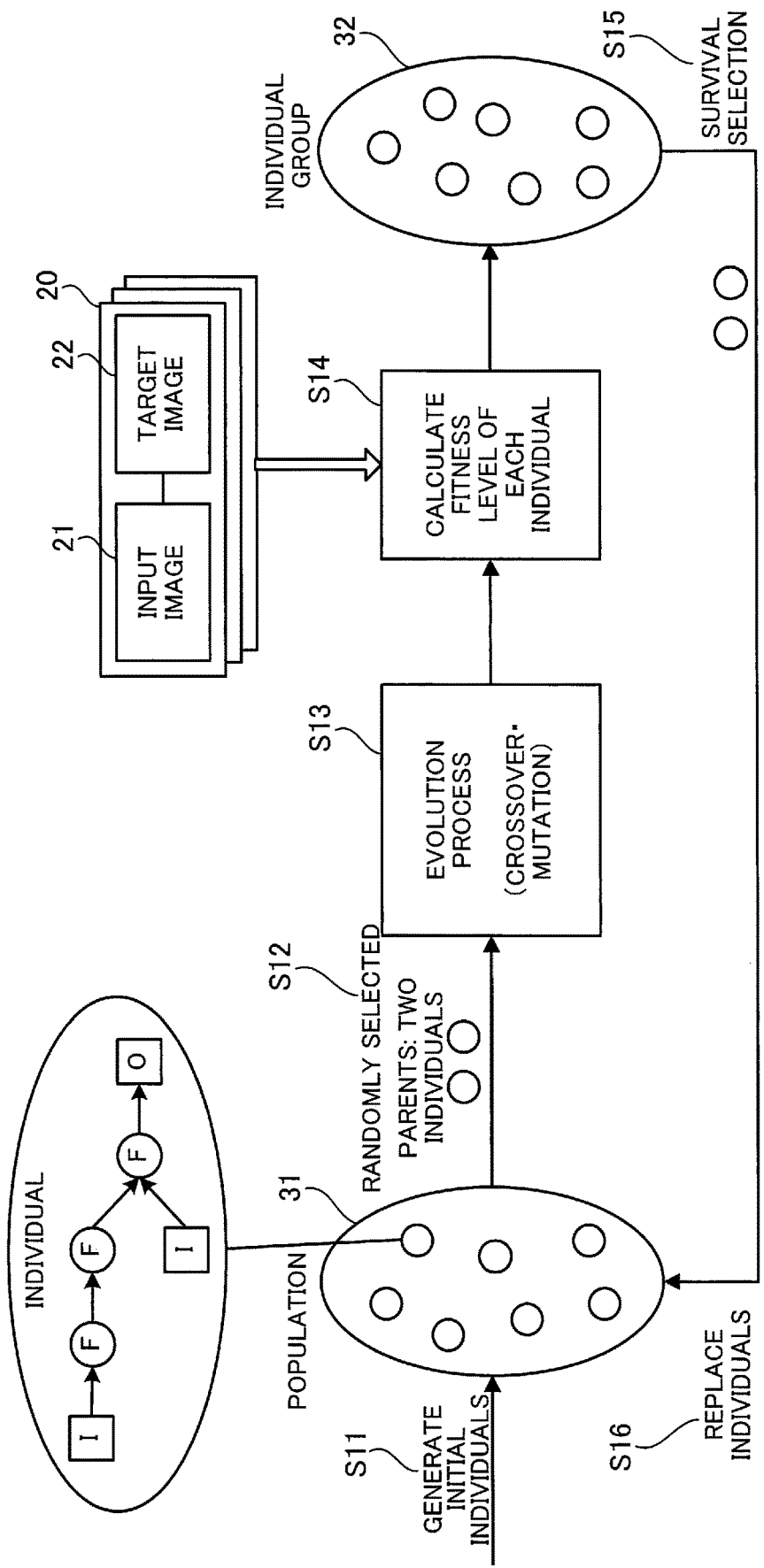
FIG. 2 illustrates a comparative example as to a process of generating an image processing program.

FIG. 2 illustrates a comparative example as to a process of generating an image processing program.

At least one piece of learning data 20 is prepared before a process of generating an image processing program is performed. The learning data 20 includes an input image 21 and a target image 22 to be obtained by performing image processing on the input image 21. The input image 21 is obtained by capturing an image of a subject by a camera, for example.

In the process of generating an image processing program using genetic programming, an individual is formed of at least one partial program. For example, an individual is defined by a tree structure, as illustrated in the upper left part of FIG. 2.

A plurality of partial programs that are candidates to be incorporated in individuals are also prepared in advance. In the following description, image filters are considered as an example of partial programs to be incorporated in individuals. However, the partial programs are not limited to image filters, and programs for performing other kinds of image processing may be used. In the upper left part of FIG. 2, "F" denotes an image filter, "I" denotes an input terminal, and "0" denotes an output terminal.

For example, the process of generating an image processing program using genetic programming is performed as follows. First, a plurality of initial individuals to be included in a population 31 are generated (Step S11). Image filters are randomly selected from a plurality of prepared image filters and are incorporated at nodes of each initial individual. Next, a predetermined number of parent individuals are randomly selected from the population 31 (step S12). As an example, it is assumed that two parent individuals are selected.

Then, an evolution process is performed on the two selected parent individuals to thereby generate a predetermined number (two or more) of child individuals (step S13). In the evolution process, a crossover operation and a mutation operation are performed on the two parent individuals. Crossover operation and mutation operation of different kinds may be performed on the two parent individuals to generate at least two child individuals. That is, the number of child individuals to be generated is greater than or equal to the number of parent individuals to be selected from the population 31.

After that, a fitness level is calculated for each of the child individuals generated as a result of the evolution process and the original parent individuals (step S14). More specifically, the fitness level of an individual is calculated by performing image processing corresponding to the individual on the input image 21 of the learning data 20 and comparing the resulting image with the corresponding target image 22. In the case where a plurality of learning data 20 is used, the average value of fitness levels obtained using the plurality of learning data 20 is calculated as the fitness level of an individual.

In this connection, the fitness levels of initial individuals included in the population 31 may be calculated when the population 31 is generated. In this case, only the fitness levels of generated child individuals are calculated at step S14.

If the fitness level of any one of the generated child individuals and original parent individuals is higher than or equal to a prescribed threshold, the individual in question is output as a final image processing program, and then the program generation processing ends. However, if the fitness levels of all the individuals are lower than the prescribed threshold, survival selection is performed on an individual group 32 including the generated child individuals and the two original parent individuals (step S15). In this survival selection, an individual with the highest fitness level is selected from the individual group 32. In addition, one individual is selected from the remaining individuals in the individual group 32 according to a predetermined method. For example, an individual is selected from the remaining individuals according to the probabilities based on the fitness levels.

The two individuals selected as the parent individuals among the individuals included in the population 31 are replaced with the two individuals selected by the survival selection (step S16). Consequently, the individuals included in the population 31 becomes the next-generation individuals. After that, the same processing as above is repeated until an individual whose fitness level is higher than or equal to the predetermined threshold appears.

Figure 3:
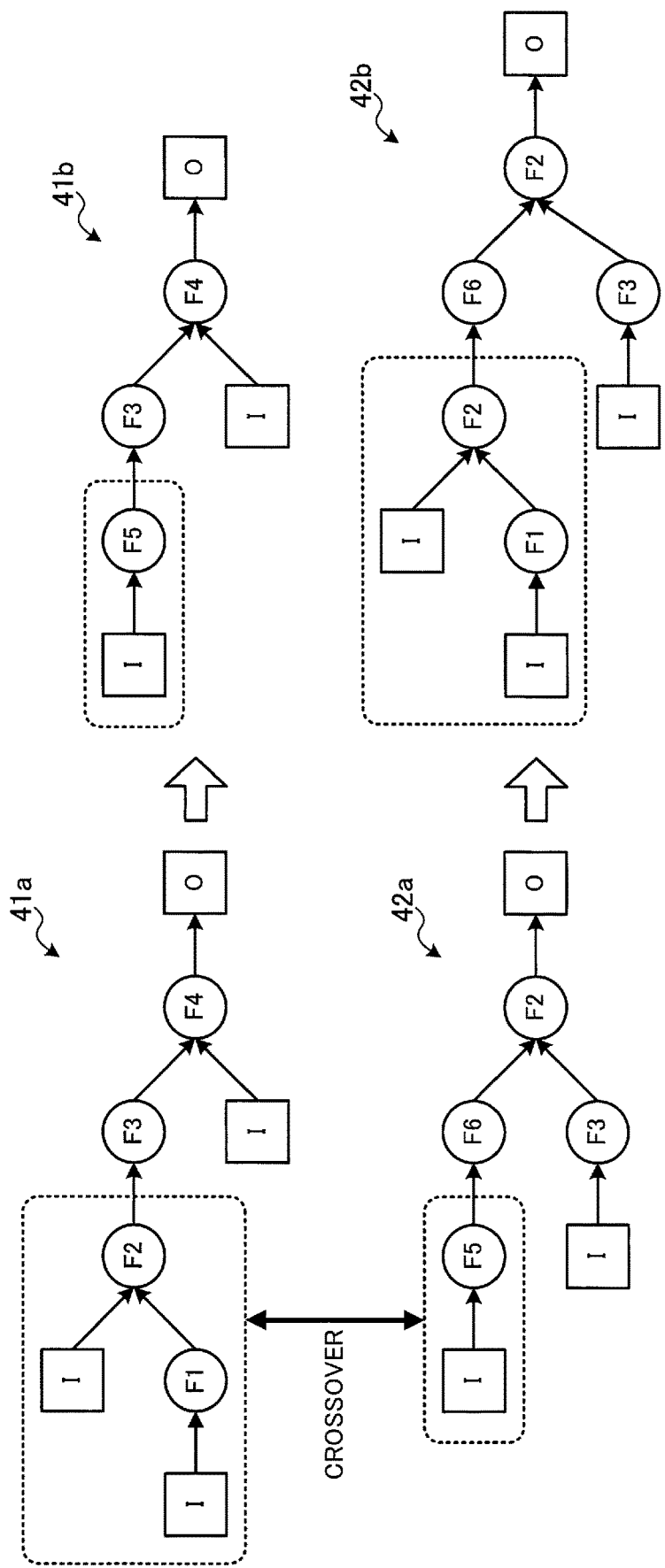
FIG. 3 illustrates an example of a crossover.

FIG. 3 illustrates an example of a crossover. FIG. 3 illustrates an example in which a crossover is performed between parent individuals 41a and 42a and thereby a child individual 41b based on the parent individual 41a and a child individual 42b based on the parent individual 42a are generated.

The parent individual 41a includes image filters F1, F2, F3, and F4, and the parent individual 42a includes image filters F2, F3, F5, and F6. It is assumed that the node of the image filter F2 in the parent individual 41a and the node of the image filter F5 in the parent individual 42a are selected as points for the crossover.

For example, in the crossover operation, not only the selected nodes but also nodes at lower levels than the selected nodes are subjected to the crossover. That is, in the example of FIG. 3, "the nodes of the image filters F2 and F1, the node of an input terminal connected to one side of the image filter F2, and the node of an input terminal connected to the image filter F1" in the parent individual 41a are replaced with "the node of the image filter F5 and the node of an input terminal connected to the image filter F5" in the parent individual 42a. As a result of this crossover, the generated child individual 41b includes the image filters F3, F4, and F5, and the generated child individual 42b includes the single image filter F1, single image filter F3, single image filter F6, and two image filters F2.

Figure 4:
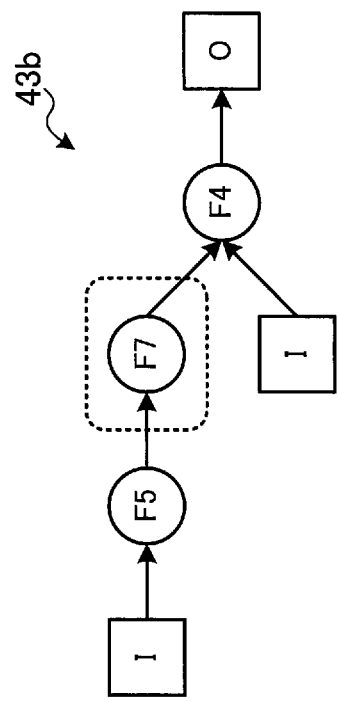
FIG. 4 illustrates an example of a mutation.
Figure 4:
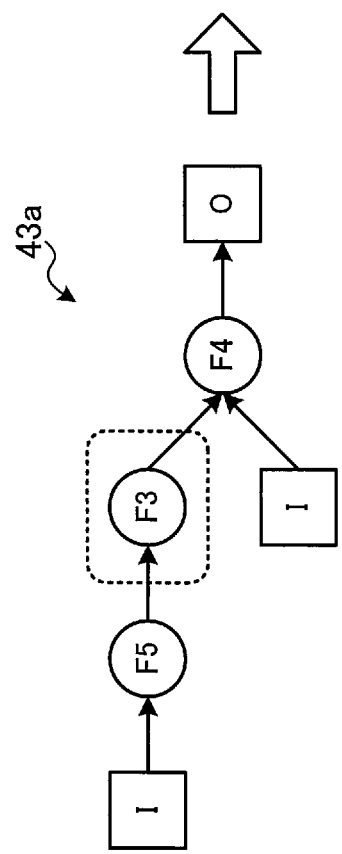

FIG. 4 illustrates an example of a mutation. Referring to FIG. 4, an individual 43a includes image filters F3, F4, and F5. For example, this individual 43a may be a parent individual selected from the population 31 or may be an individual that is obtained by performing a crossover after being selected as a parent individual from the population 31.

Now, it is assumed that the node of the image filter F3 in the individual 43a is selected as a point for the mutation and an image filter F7 is selected as an image filter used for replacement in the mutation. In this connection, the image filter used for the replacement in the mutation is randomly selected from a plurality of prepared image filters. As a result of the mutation, a child individual 43b including the image filters F4, F5, and F7 is generated.

For example, the image processing program generated in the above-described comparative example may be used in the field of factory automation (FA) to perform image processing on captured images of products to apply desired effects. More specifically, the image processing program may be used to perform image processing on captured images of the external appearances of products to extract defective portions or alignment portions.

For such a purpose, an image processing algorithm may need to be reconfigured according to a change or modification of products, which are subjects for image capturing, and a change of imaging environment. In view of this, an easily-configurable image processing algorithm is demanded. In addition, an image processing algorithm having high robustness against changes of imaging environment, such as changes of lighting conditions and variations of shapes, positions, and orientations of subjects, is demanded.

In the case of using genetic programming, it is possible to easily generate an image processing program for such a purpose, only by preparing an input image 21 and a corresponding target image 22. In addition, it is also possible to automatically generate an image processing algorithm with high robustness against changes of imaging environment, by preparing a plurality of combinations (learning data 20) each including an input image 21 and a target image 22 obtained under a different imaging environment.

(Problem With Comparative Example)

In the above-described comparative example, the number of child individuals to be generated from two parent individuals is fixed in the evolution process of step S13 illustrated in FIG. 2. The following problem arises due to the number of child individuals to be generated. If a small number of child individuals are to be generated, the fitness levels of the child individuals are not likely to increase, and thus the learning progress rate decreases. If a large number of child individuals are to be generated, the fitness levels of the child individuals are likely to increase with generation. However, the number of calculations regarding the fitness levels increases with generation, and the learning time per generation lengthens. That is to say, to increase the number of child individuals to be generated does not always lead to reducing the time taken to generate a program.

This problem will be described in more detail with reference to FIGS. 5A and 5B.

Figure 5A:
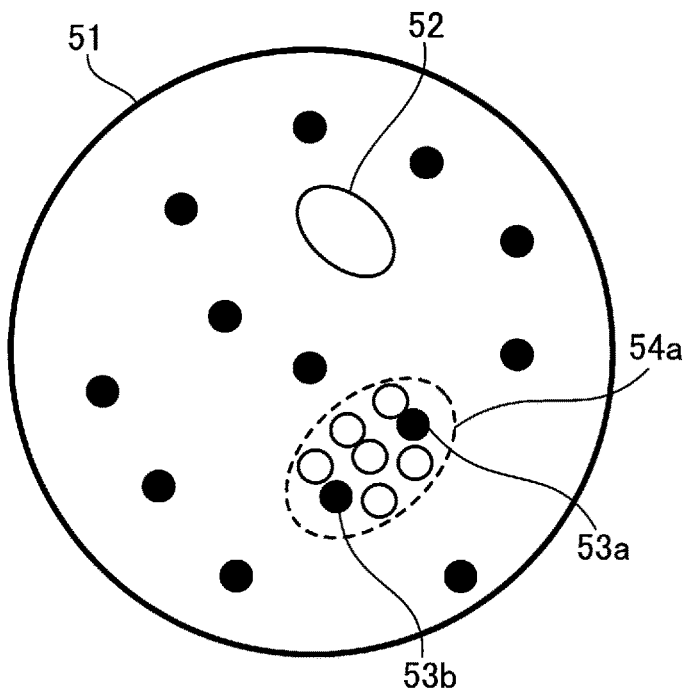
FIGS. 5A and 5B schematically illustrate the relationship between the number of child individuals and search area.
Figure 5B:
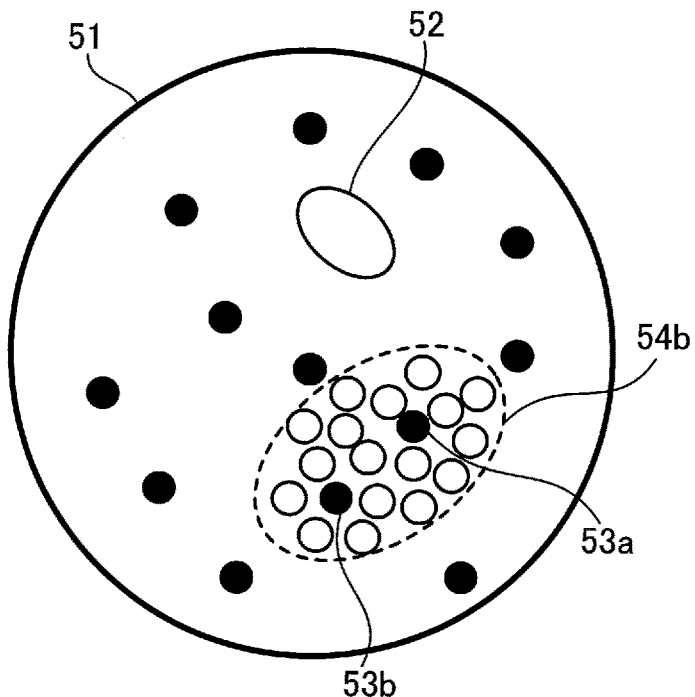

FIGS. 5A and 5B schematically illustrate the relationship between the number of child individuals and search area. In FIGS. 5A and 5B, a solution search space 51 is schematically illustrated as a space including individuals. In this solution search space 51, the fitness level of each individual is represented by how close the individual is to a correct area 52. In this connection, in FIGS. 5A and 5B, black circles represent individuals included in a population 31 at a certain generation, and white circles represent child individuals generated based on individuals selected from the population 31.

In the learning using genetic programming as described in the above comparative example, individuals in the population 31 are updated to child individuals having higher fitness levels, so as to increase the fitness levels of the individuals included in the population 31 as a whole. This means that the individuals in the solution search space 51 entirely get closer to the correct area 52. Then, when an individual whose fitness level exceeds a prescribed threshold appears, that is, when an individual that is in the correct area 52 appears, the individual is output as a learning result.

By the way, child individuals generated from parent individuals selected from the population 31 appear in an area relatively closer to the parent individuals in the solution search space 51. This is because the child individuals are generated by modifying parts of the parent individuals and therefore are somewhat similar to the parent individuals.

FIG. 5A illustrates an example where a small number of child individuals are generated from two parent individuals 53a and 53b, and FIG. 5B illustrates an example where a large number of child individuals are generated from the two parent individuals 53a and 53b. Search areas 54a and 54b are each an area covering an individual group including the two parent individuals 53a and 53b selected from the population 31 and child individuals generated from the parent individuals 53a and 53b.

The search area 54b illustrated in FIG. 5B is probably larger than the search area 54a illustrated in FIG. 5A. In other words, the more the child individuals generated, the larger the search area. This is because, when the number of child individuals to be generated is increased, more modification patterns are generated from parent individuals, and more child individuals are generated at positions in different directions from the positions of the parent individuals in the solution search space 51.

Therefore, to increase the number of child individuals to be generated in order to widen the search area raises the possibility that a group of generated child individuals includes a child individual closer to the correct area 52, that is, a child individual with a higher fitness level. Thus, in the same generation, the case where more child individuals are generated produces a higher increasing rate of the maximum fitness level among the fitness levels of the child individuals included in a population.

However, the more the number of child individuals generated, the more the number of calculations regarding the fitness levels of child individuals per generation. This results that the processing time per generation lengthens. Even in consideration of an improvement in the increasing rate of the maximum fitness level every generation, the time taken for the maximum fitness level to reach a prescribed threshold is not always reduced but is likely to lengthen to the contrary. In short, to fix the number of child individuals to be generated to a large value does not always lead to reducing the time taken to generate a program.

(Outline of Program Generation Process According to Second Embodiment)

In order to solve the above problem, the program generation process of the second embodiment is derived by modifying the process of the above-described comparative example so as to dynamically change the number of child individuals to be generated according to the increasing rate of the maximum fitness level among the fitness levels of the individuals included in the population 31.

Figure 6:
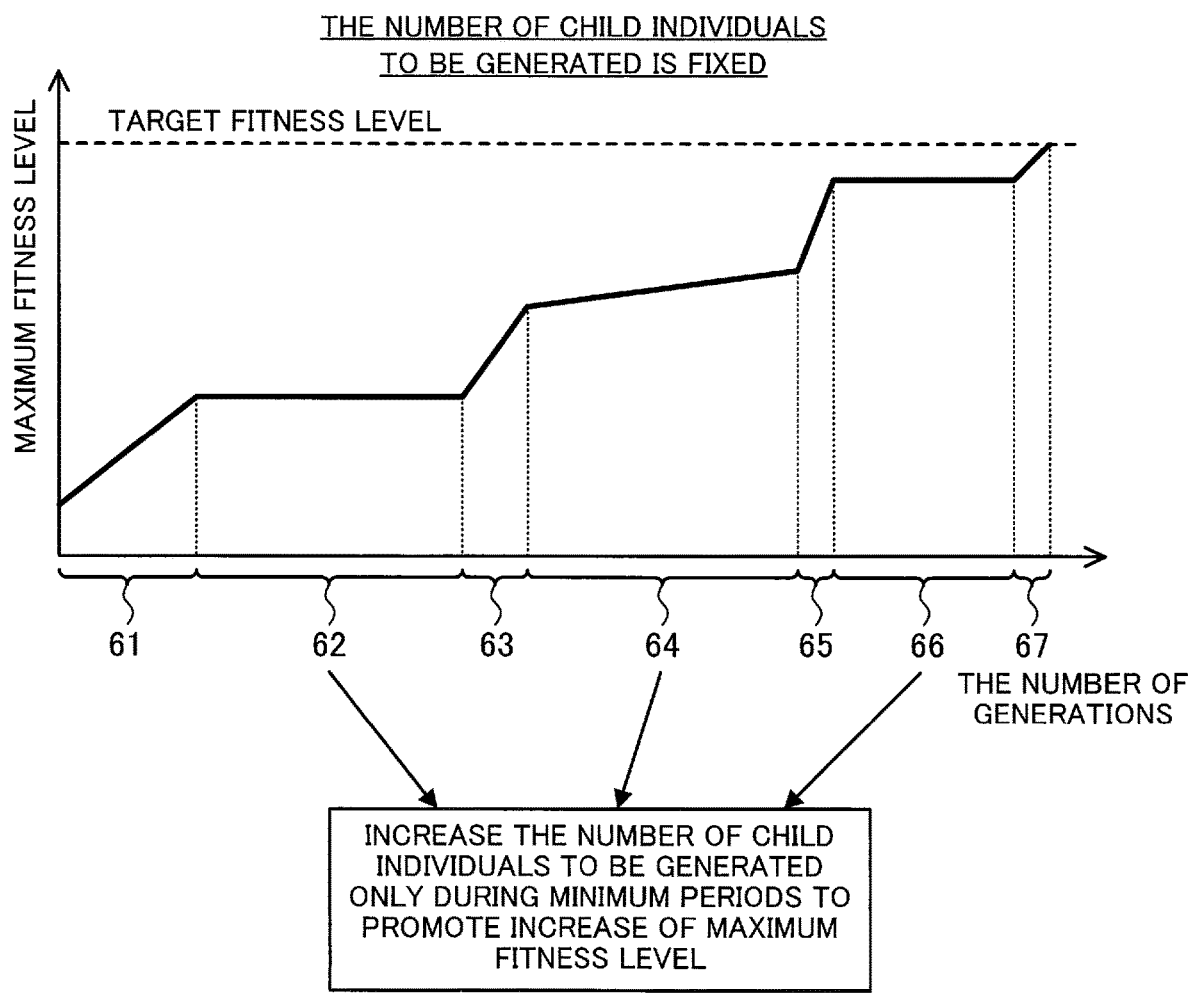
FIG. 6 illustrates an example of changes in the maximum fitness level in the case where the number of child individuals to be generated is fixed.

FIG. 6 illustrates an example of changes in the maximum fitness level in the case where the number of child individuals to be generated is fixed. In FIG. 6, the increasing rate of the maximum fitness level is higher than or equal to a prescribed threshold during periods 61, 63, 65, and 67. However, during periods 62, 64, and 66, the increasing rate of the maximum fitness level is lower than the prescribed threshold, i.e., the learning progress is stagnant.

The image processing apparatus of the present embodiment increases the number of child individuals to be generated from parent individuals in one generation, only during periods in which the increasing rate of the maximum fitness level is low, as in the periods 62, 64, and 66, in order to promote an increase in the maximum fitness level. By increasing the number of child individuals to be generated only during minimum periods, it is possible to keep the increasing rate of the maximum fitness level at a certain level or higher while minimizing the processing time, and thus to reduce the time taken to generate a program.

To reduce the processing time, it is desirable that a period (the number of generations) during which a large number of child individuals are to be generated be shorter than a period (the number of generations) during which a small number of child individuals are to be generated. In view of this, the image processing apparatus of the present embodiment increases the number of child individuals to be generated for a certain number of generations when the increasing rate of the maximum fitness level falls under the threshold, and then decreases the number of child individuals to be generated for more generations irrespective of the increasing rate of the maximum fitness level.

As seen in the example of FIG. 6, in general, in the case where the number of child individuals to be generated is fixed, the maximum fitness level increases stepwise. Therefore, there is a high possibility that the increasing rate of the maximum fitness level is kept at a certain level or higher by increasing the number of child individuals to be generated for a certain number of generations, even if the number of child individuals to be generated is decreased thereafter. That is, by controlling the number of child individuals to be generated as described above, it is possible to reduce the periods during which the number of calculations regarding the fitness levels of child individuals increases, while improving the increasing rate of the maximum fitness level, and thus to streamline the learning.

(Details of Image Processing Apparatus According to Second Embodiment)

The image processing apparatus of the second embodiment will now be described in detail.

Figure 7:
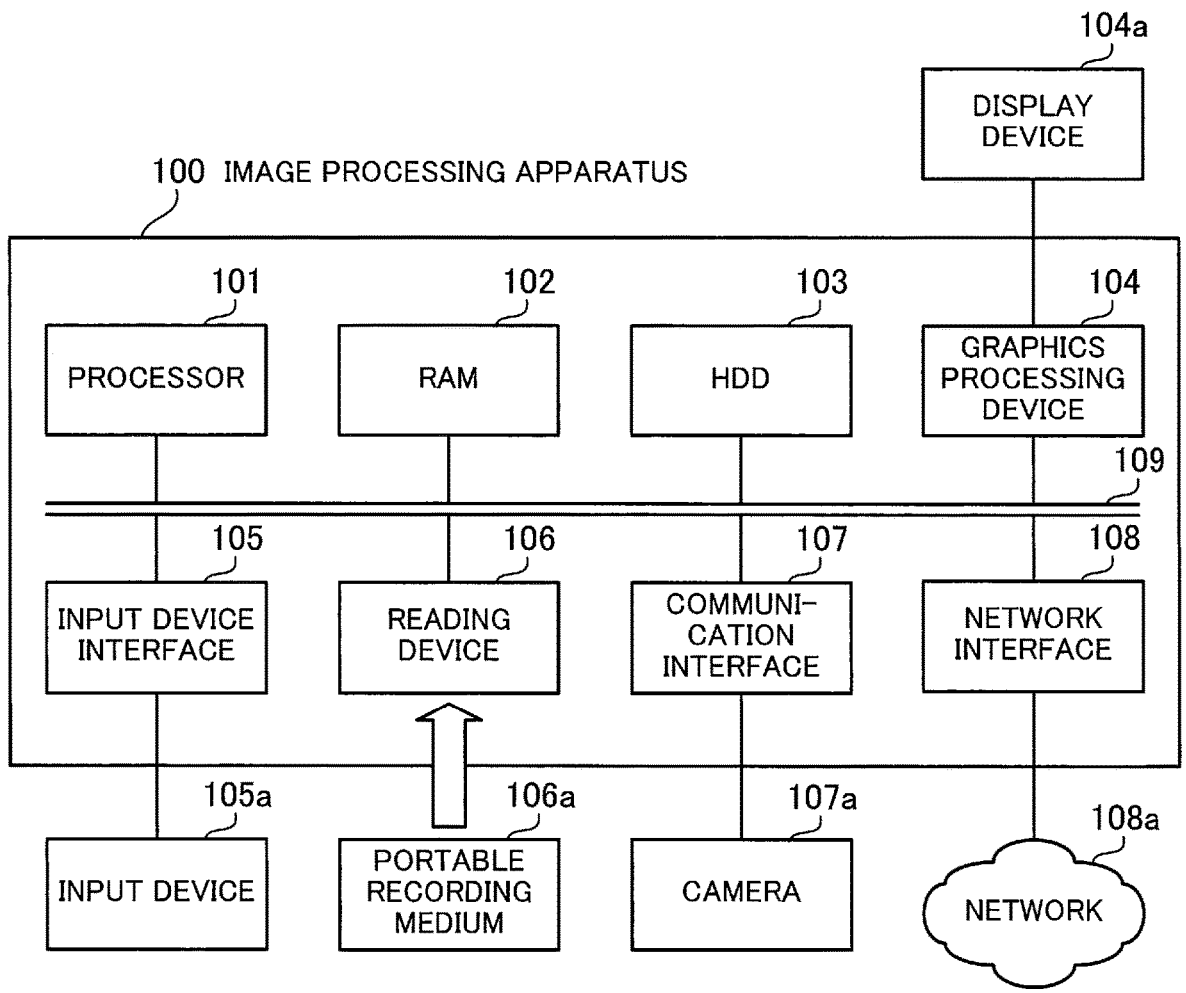
FIG. 7 illustrates an example of a hardware configuration of an image processing apparatus.

FIG. 7 illustrates an example of a hardware configuration of an image processing apparatus. The image processing apparatus 100 of the present embodiment is implemented by using a computer illustrated in FIG. 7, for example.

The image processing apparatus 100 is entirely controlled by a processor 101. The processor 101 may be a multiprocessor. Examples of the processor 101 include a Central Processing Unit (CPU), a Micro Processing Unit (MPU), a Digital Signal Processor (DSP), an Application Specific Integrated Circuit (ASIC), and a Programmable Logic Device (PLD). The processor 101 may be a combination of at least two components selected from a CPU, an MPU, a DSP, an ASIC, and a PLD.

The processor 101 is connected to a RAM 102 and a plurality of peripheral devices via a bus 109.

The RAM 102 is used as a main storage device of the image processing apparatus 100. The RAM 102 temporarily stores therein at least part of an operating system (OS) program and an application program that are executed by the processor 101. In addition, the RAM 102 stores therein various kinds of data to be used by the processor 101 in processing.

The peripheral devices connected to the bus 109 include an HDD 103, a graphics processing device 104, an input device interface 105, a reading device 106, a communication interface 107, and a network interface 108.

The HDD 103 is used as an auxiliary storage device of the image processing apparatus 100. An OS program, application programs, and various kinds of data are stored in the HDD 103. A different kind of non-volatile storage device, such as a Solid State Drive (SSD), may be used as the auxiliary storage device.

The graphics processing device 104 is connected to a display device 104a. The graphics processing device 104 displays images on a screen of the display device 104a in accordance with instructions from the processor 101. The display device may be a liquid crystal display, an organic ElectroLuminescence (EL) display, or another.

The input device interface 105 is connected to an input device 105a. The input device interface 105 gives a signal output from the input device 105a to the processor 101. The input device 105a may be a keyboard, a pointing device, or another. Examples of the pointing device include a mouse, a touch panel, a tablet, a touchpad, and a trackball.

A portable recording medium 106a is detachably attached to the reading device 106. The reading device 106 reads data recorded on the portable recording medium 106a and gives the read data to the processor 101. The portable recording medium 106a may be an optical disc, a magneto-optical disk, a semiconductor memory, or another.

The communication interface 107 communicates data with an external device connected thereto. In the present embodiment, a camera 107a as an external device is connected to the communication interface 107. The communication interface 107 gives image data sent from the camera 107a to the processor 101.

The network interface 108 communicates data with other apparatuses over a network 108a.

The processing functions of the image processing apparatus 100 may be implemented with the above hardware configuration.

Figure 8:
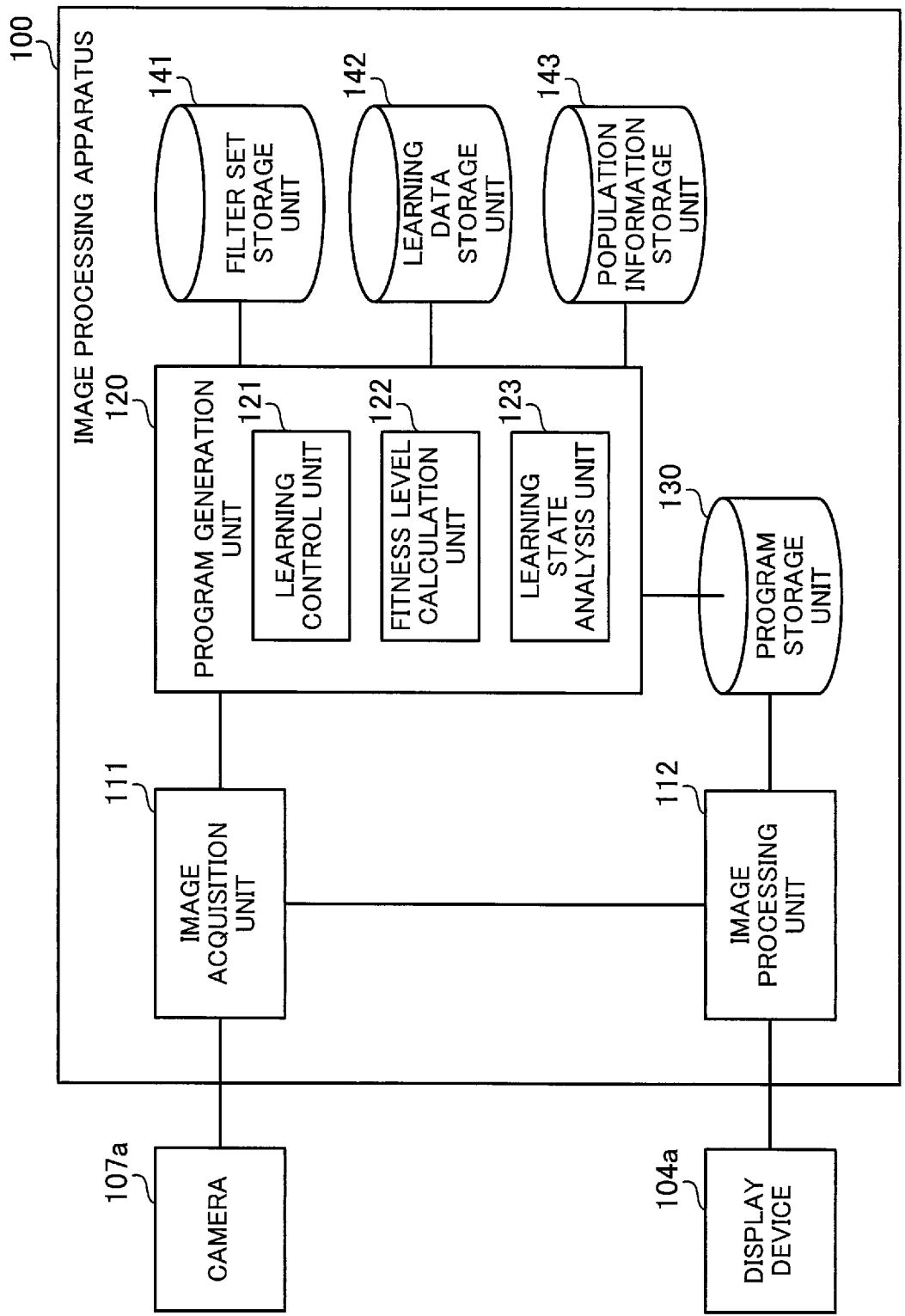
FIG. 8 is a block diagram illustrating a configuration example of processing functions of the image processing apparatus.

FIG. 8 is a block diagram illustrating a configuration example of processing functions of the image processing apparatus. The image processing apparatus 100 includes an image acquisition unit 111, an image processing unit 112, a program generation unit 120, a program storage unit 130, a filter set storage unit 141, a learning data storage unit 142, and a population information storage unit 143.

The processing of the image acquisition unit 111, image processing unit 112, and program generation unit 120 is implemented by the processor 101 of the image processing apparatus 100 running prescribed programs, for example. In addition, part of the processing of the image processing unit 112 is implemented by the processor 101 of the image processing apparatus 100 running an image processing program stored in the program storage unit 130. The program storage unit 130, filter set storage unit 141, and learning data storage unit 142 are implemented as a storage space set aside in the HDD 103 of the image processing apparatus 100, for example. The population information storage unit 143 is implemented as a storage space set aside in the RAM 102 of the image processing apparatus 100, for example.

The image acquisition unit 111 obtains data on a captured image from the camera 107a and outputs the data to the program generation unit 120 or image processing unit 112.

The program generation unit 120 generates an image processing program using genetic programming, and stores the generated image processing program in the program storage unit 130. The internal configuration of the program generation unit 120 will be described in detail later.

The image processing unit 112 obtains data on an image captured by the camera 107a, via the image acquisition unit 111. The image processing unit 112 performs image processing on the obtained image in accordance with the image processing program stored in the program storage unit 130. The processed image is displayed on the display device 104a, for example.

The program storage unit 130 stores therein the image processing program generated by the program generation unit 120.

The filter set storage unit 141 stores therein a plurality of image filter programs that are candidates to be incorporated in individuals that are generated by the program generation unit 120.

The learning data storage unit 142 stores therein one or more pieces of learning data each including data of an input image and target image. The input images included in the learning data may be images captured by the camera 107a connected to the image processing apparatus 100, for example.

The population information storage unit 143 stores therein information on each individual included in the population 31. The information on each individual includes information indicating the tree structure of the individual and a calculated fitness level of the individual. In addition, the population information storage unit 143 stores therein history information about the maximum fitness level among the fitness levels of the individuals included in the population 31 at each generation.

The program generation unit 120 includes a learning control unit 121, a fitness level calculation unit 122, and a learning state analysis unit 123.

The learning control unit 121 collectively controls the entire program generation process that is performed by the program generation unit 120. For example, the learning control unit 121 generates initial individuals to be included in the population 31, performs an evolution process on individuals, performs a survival selection process based on fitness levels, outputs a final image processing program, and updates the population 31 using survival-selected individuals.

The fitness level calculation unit 122 calculates the fitness level of an individual for evaluation. More specifically, the fitness level calculation unit 122 performs image processing on an input image included in learning data according to an image processing program configured based on the tree structure of an individual. Then, the fitness level calculation unit 122 calculates the degree of similarity between an image obtained by the image processing and a target image corresponding to the input image, as the fitness level of the individual.

The learning state analysis unit 123 calculates an index representing a learning state. In the present embodiment, the learning state analysis unit 123 calculates the increasing rate of the maximum fitness level among the fitness levels of the individuals in the population 31, on the basis of the history information stored in the population information storage unit 143. The increasing rate indicates the learning progress rate along with generational change. In the following description, the maximum fitness level among the fitness levels of individuals in the population 31 may be referred to as "the maximum fitness level of the population 31."

The following describes a process of generating an image processing program, which is performed by the image processing apparatus 100, with reference to flowcharts.

Figure 9:
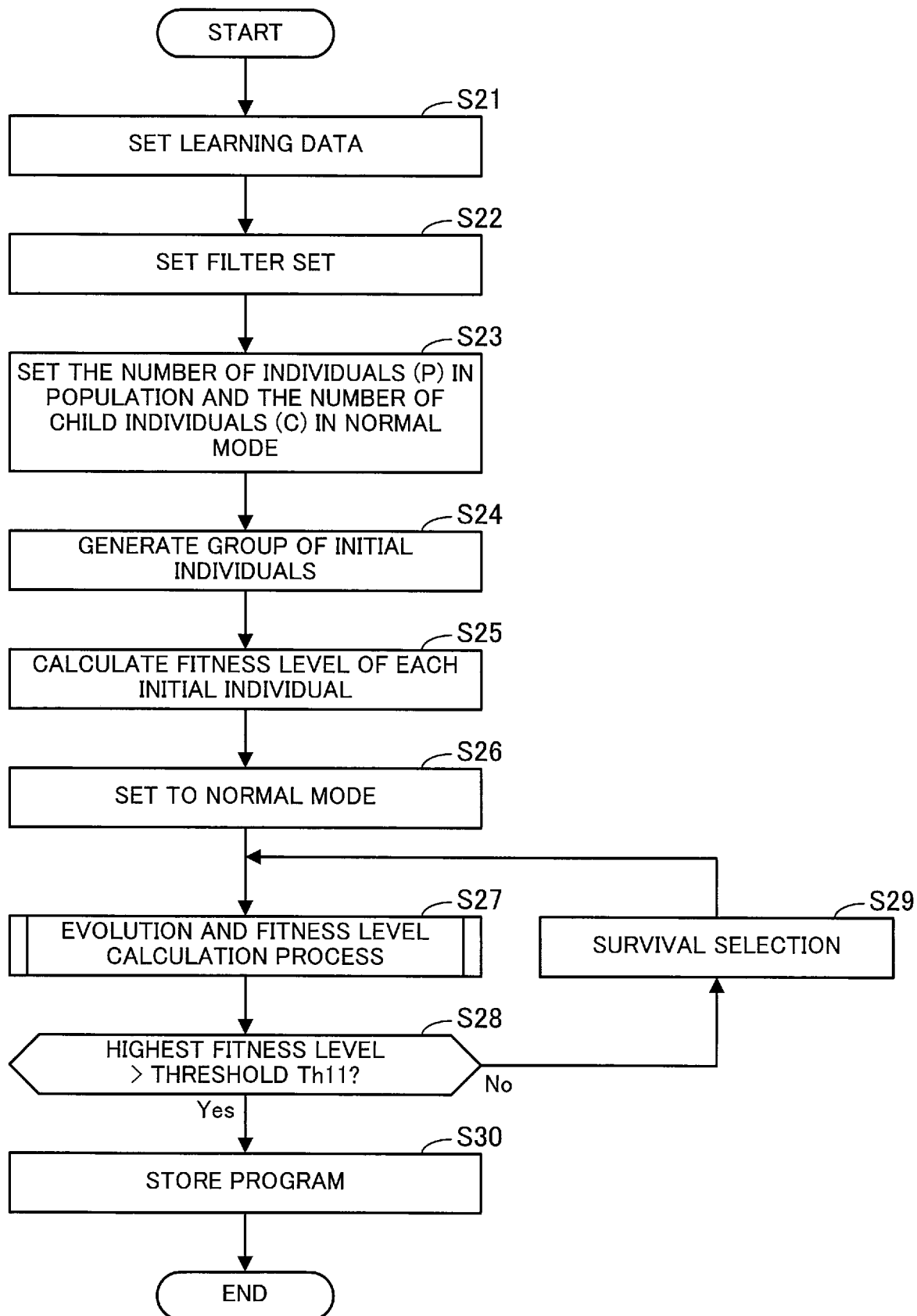
FIG. 9 is a flowchart illustrating an example of a program generation process.

FIG. 9 is a flowchart illustrating an example of a program generation process.

In the process of FIG. 9, one of "normal mode" and "increase mode" is set as an operation mode for an evolution and fitness level calculation process. In the normal mode, C child individuals are generated at each generation. In the increase mode, child individuals to be generated at each generation are k times (k>1) as many as child individuals to be generated in the normal mode.

In the case where the maximum fitness level of the population 31 is lower than a threshold, the following control is exercised: the normal mode is switched to the increase mode, and after the increase mode is maintained for a certain number of generations, the increase mode is always switched back to the normal mode. Here, it is assumed that the normal mode is maintained for the certain number of generations or longer, meaning that a period (the number of generations) set for the normal mode is longer than a period (the number of generations) set for the increase mode.

In the present embodiment, for example, the number of individuals included in the population 31 is taken as P, the minimum period L for the normal mode is set to P/2. In the case where two parent individuals are selected from the population 31, "P/2" corresponds to the number of generations during which the individuals in the population 31 are replaced once on average. On the other hand, in the embodiment, the period D for the increase mode is set to P/10. The period D is set to an empirical value. If the period D is long, the processing time lengthens. However, if the period D is too short, only a few individuals are selected as parent individuals among the individuals of the population 31, and it is not possible to produce a sufficient increase in the maximum fitness level of the population 31.

As a reference, the period D may be calculated as follows, for example. To reduce the average processing time per generation to d (d>1) in the case where both the normal mode and the increase mode are used, the following inequality, $1 \times (1-m) + k \times m \leq d$, needs to be satisfied, where k denotes the increasing rate of the number of child individuals in the increase mode and m ($0 \leq m \leq 1$) denotes a ratio of a period for the increase mode to the total period. By modifying the inequality, the following inequality, $m \leq (d-1)/(k-1)$, is obtained.

For example, assuming that, in the increase mode, the number of individuals is increased five times (that is, the increasing rate k=5) and the average processing time per generation is increased only 1.5 times, $m \leq (1.5-1)/5-1) = \frac{1}{8}$ is obtained. In this case, for example, the period D for the increase mode is set to ⅛ of the minimum period L set for the normal mode.

(Step S21) The learning control unit 121 receives an input operation for setting learning data. For example, learning data to be used in this process is specified among the learning data stored in the learning data storage unit 142.

(Step S22) The learning control unit 121 receives an input operation for setting a filter set. For example, image filters to be used in this process are specified among the image filters stored in the filter set storage unit 141.

(Step S23) The learning control unit 121 receives an input operation for setting the number of individuals P to be included in the population 31 and the number of child individuals C to be generated in the normal mode.

(Step S24) The learning control unit 121 generates P initial individuals to be included in the population 31. Each initial individual is generated by randomly selecting and combining image filters among the image filters specified at step S22 at the nodes of a tree structure. In addition, the tree structure for each initial individual is randomly selected from a plurality of predetermined tree structures, for example. Alternatively, the tree structure itself may be randomly determined.

The learning control unit 121 registers information on each generated initial individual in the population information storage unit 143.

(Step S25) The fitness level calculation unit 122 calculates the fitness level of each initial individual included in the population 31. More specifically, the fitness level calculation unit 122 performs image processing on an input image included in the learning data according to the image processing program corresponding to an initial individual. The fitness level calculation unit 122 then calculates the degree of similarity between the image obtained by the image processing and the target image corresponding to the input image, as the fitness level of the initial individual. In the case where a plurality of learning data is registered, the fitness level calculation unit 122 calculates the degree of similarity using each learning data and takes the average value of the calculated degrees of similarity as the fitness level of the initial individual. The fitness level calculation unit 122 registers the fitness level calculated for each initial individual in the population information storage unit 143.

(Step S26) The learning control unit 121 sets the operation mode to the normal mode.

(Step S27) The evolution and fitness level calculation process is performed. Basically, two parent individuals are selected from the population 31, and at least two child individuals are generated based on these parent individuals, and the fitness level of each child individual is calculated. The evolution and fitness level calculation process will be described in detail later with reference to FIG. 10.

(Step S28) The learning control unit 121 selects an individual with the highest fitness level from the parent individuals selected at step S27 and the child individuals generated at step S27, and determines whether the fitness level is higher than a threshold Th11. If the fitness level is lower than or equal to the threshold Th11, step S29 is executed. Otherwise, step S30 is executed.

(Step S29) The learning control unit 121 selects the individual with the highest fitness level as an individual allowed to survive from the parent individuals selected at step S27 and the child individuals generated at step S27. In addition, the learning control unit 121 selects one more individual that is allowed to survive from the remaining individuals. In this selection, for example, the individual is selected according to probabilities based on the calculated fitness levels.

Among the individuals in the population 31, the learning control unit 121 replaces the two individuals selected as parent individuals at step S27 with the two individuals selected as individuals allowed to survive. Thereby, the generation of the population 31 progresses. To this end, the learning control unit 121 deletes information on the two individuals selected as parent individuals at step S27 from the population information storage unit 143, and registers information on the two individuals selected as individuals allowed to survive in the population information storage unit 143.

Alternatively, the learning control unit 121 may replace two individuals with two smallest fitness levels among the individuals included in the population with the two individuals selected as individuals allowed to survive, for example.

(Step S30) The learning control unit 121 stores the image processing program corresponding to the individual with the highest fitness level selected at step S28 in the program storage unit 130, and then ends the process.

Figure 10:
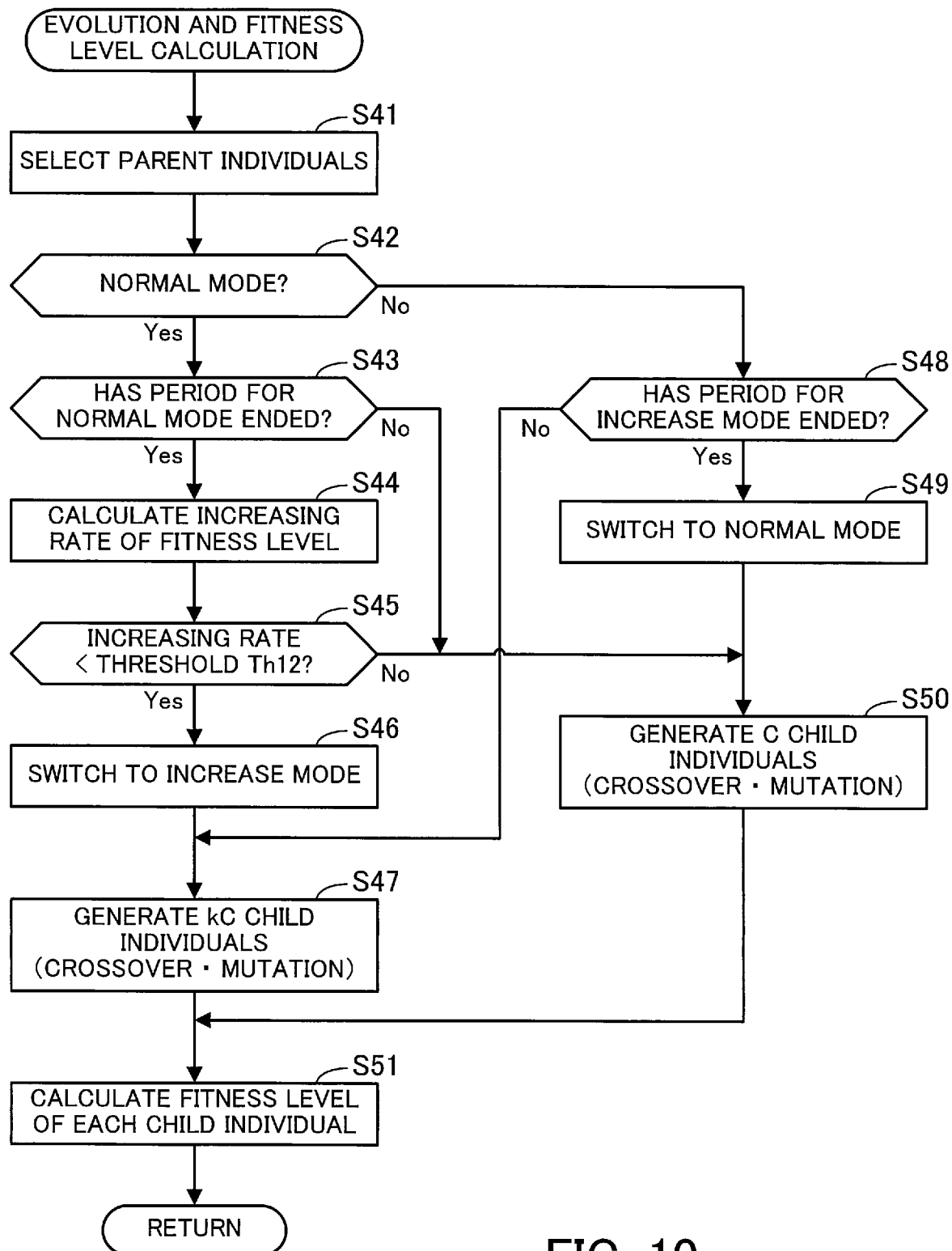
FIG. 10 is a flowchart illustrating an example of an evolution and fitness level calculation process.

FIG. 10 is a flowchart illustrating an example of the evolution and fitness level calculation process. This process of FIG. 10 is performed at step S27 of FIG. 9.

(Step S41) The learning control unit 121 randomly selects two parent individuals from the individuals included in the population 31.

(Step S42) The learning control unit 121 determines whether the current operation mode is the normal mode. If the current operation mode is the normal mode, step S43 is executed. If the current operation mode is not the normal mode, that is, if the current operation mode is the increase mode, step S48 is executed.

(Step S43) The learning control unit 121 determines whether the period for the normal mode has ended. More specifically, if the period set for the normal mode exceeds the aforementioned minimum period L (that is, the number of repetitions of step S43 after the start of the normal mode exceeds L), the learning control unit 121 determines that the period for the normal mode has ended. If it is determined that the period for the normal mode has ended, step S44 is executed. Otherwise, step S50 is executed.

(Step S44) The learning state analysis unit 123 calculates the increasing rate of the maximum fitness level of the population 31 over a predetermined number of past generations on the basis of the history information stored in the population information storage unit 143. In the present embodiment, the increasing rate of the maximum fitness level of the population 31 over the past L generations is calculated, for example. The increasing rate is calculated by subtracting the maximum fitness level of the population 31 L generations ago from the maximum fitness level of the population 31 at the current generation and dividing the subtraction result by L.

In this connection, for calculating the increasing rate, the population information storage unit 143 stores therein history information about the maximum fitness levels of the population 31 corresponding to at least past L generations.

(Step S45) The learning control unit 121 determines whether the increasing rate calculated at step S44 is lower than a prescribed threshold Th12. If the increasing rate is lower than the threshold Th12, step S46 is executed. Otherwise, step S50 is executed with the normal mode maintained as the operation mode. That is, if the increasing rate is higher than or equal to the threshold Th12, the period of the normal mode is extended to be longer than the minimum period L.

(Step S46) The learning control unit 121 switches the operation mode from the normal mode to the increase mode.

(Step S47) The learning control unit 121 generates kC child individuals from the two parent individuals selected at step S41. In this connection, the child individuals are generated in the following manner, for example. The learning control unit 121 performs a crossover between the two parent individuals to generate a predetermined number (two or more) of child individuals. In addition, the learning control unit 121 performs a mutation on any node of a generated child individual to replace the image filter incorporated at the node of the child individual with any of the other image filters specified at step S22 of FIG. 9.

(Step S48) The learning control unit 121 determines whether the period for the increase mode has ended. More specifically, if the period set for the increase mode exceeds the aforementioned period D (that is, the number of repetitions of step S48 after the start of the increase mode exceeds D), the learning control unit 121 determines that the period for the increase mode has ended. If it is determined that the period for the increase mode has ended, step S49 is executed. Otherwise, step S47 is executed.

(Step S49) The learning control unit 121 switches the operation mode from the increase mode to the normal mode.

(Step S50) The learning control unit 121 generates C child individuals from the two parent individuals selected at step S41.

(Step S51) The fitness level calculation unit 122 calculates the fitness level of each of the kC child individuals generated at step S47 or the C child individuals generated at step S50. Then, step S28 of FIG. 9 is executed.

According to the above-described processes of FIGS. 9 and 10, if the increasing rate of the maximum fitness level of the population 31 is determined to be lower than the threshold Th12 after the normal mode is maintained for the minimum period L or longer, the operation mode is switched to the increase mode. Thereby, the number of child individuals to be generated is increased, and an increase in the maximum fitness level of the population 31 is promoted. Then, after the increase mode is maintained for the period D, the operation mode is switched to the normal mode, and the normal mode is maintained for the minimum period L or longer, which is longer than the period D. Then, if the increasing rate of the maximum fitness level of the population 31 is determined to be lower than the threshold Th12 again, the operation mode is switched to the increase mode again to promote an improvement in the increasing rate.

Figure 11:
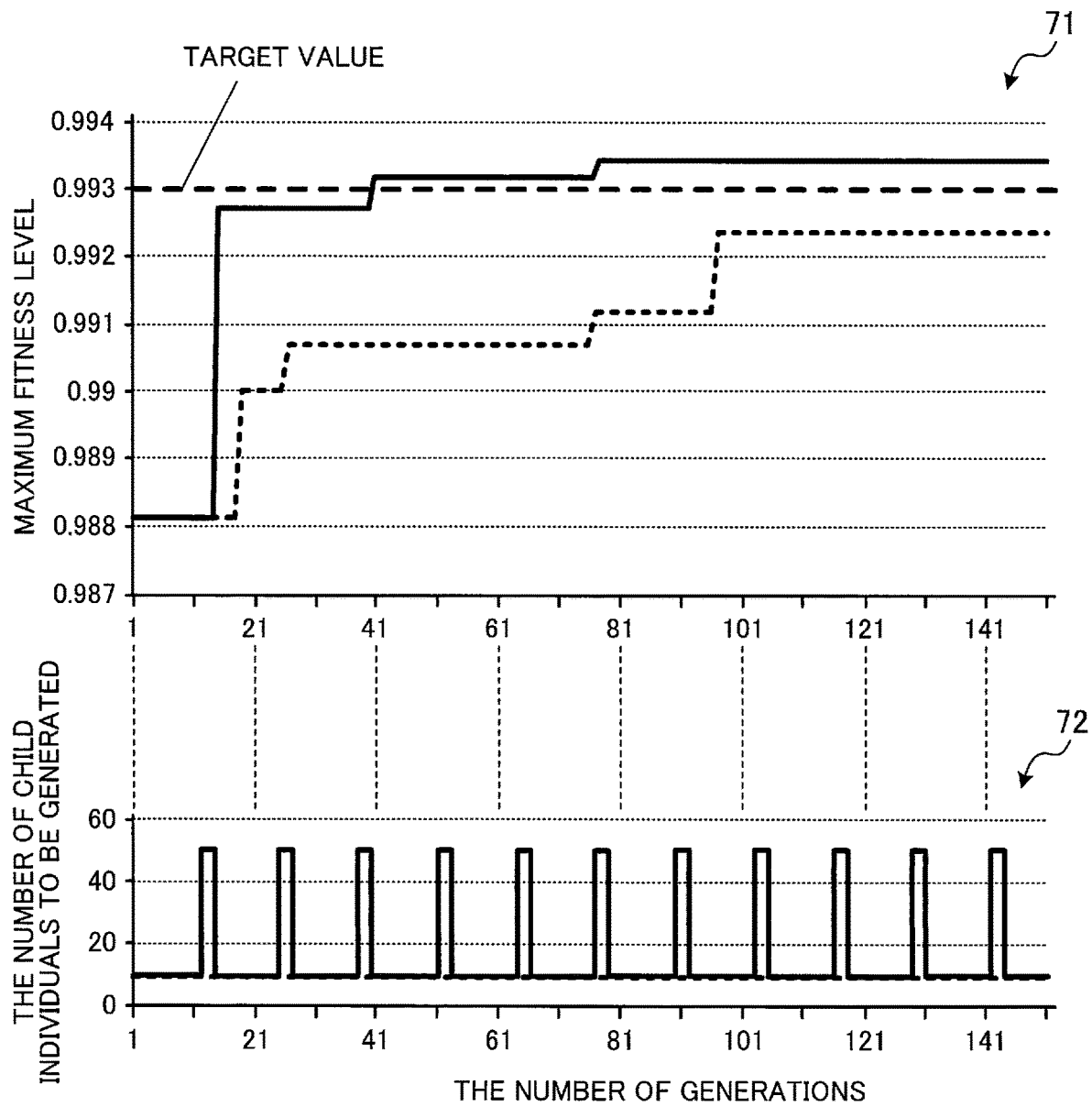
FIG. 11 illustrates an example of changes in the maximum fitness level and the number of child individuals to be generated, along with generational change.

FIG. 11 illustrates an example of changes in the maximum fitness level and the number of child individuals to be generated, along with generational change. In FIG. 11, a graph 71 represents an example of changes in the maximum fitness level of the population 31, whereas a graph 72 represents an example of changes in the number of child individuals to be generated.

In the graph 71, a dotted line represents a comparative example in which the normal mode continues to be maintained in learning, whereas an actual line represents an example in which the operation mode is switched between the normal mode and the increase mode according to the increasing rate of the maximum fitness level. In addition, an actual line in the graph 72 indicates the number of child individuals to be generated in the case where the operation mode is switched between the normal mode and the increase mode according to the increasing rate of the maximum fitness level. In this example, in most cases, the increasing rate of the maximum fitness level is temporarily improved when the operation mode is switched to the increase mode. However, when the operation mode is switched back to the normal mode, the increasing rate decreases. Therefore, the operation mode is switched to the increase mode at almost fixed intervals, as seen from the actual line of the graph 72.

As seen from the graph 71, in the case where the increasing rate of the maximum fitness level is lower than the threshold Th11, the operation mode is switched to the increase mode to increase the number of child individuals to be generated, thereby promoting an increase in the maximum fitness level. Therefore, the maximum fitness level reaches a desired target value in a small number of generations, compared with the case where the normal mode is maintained as the operation mode.

Figure 12:
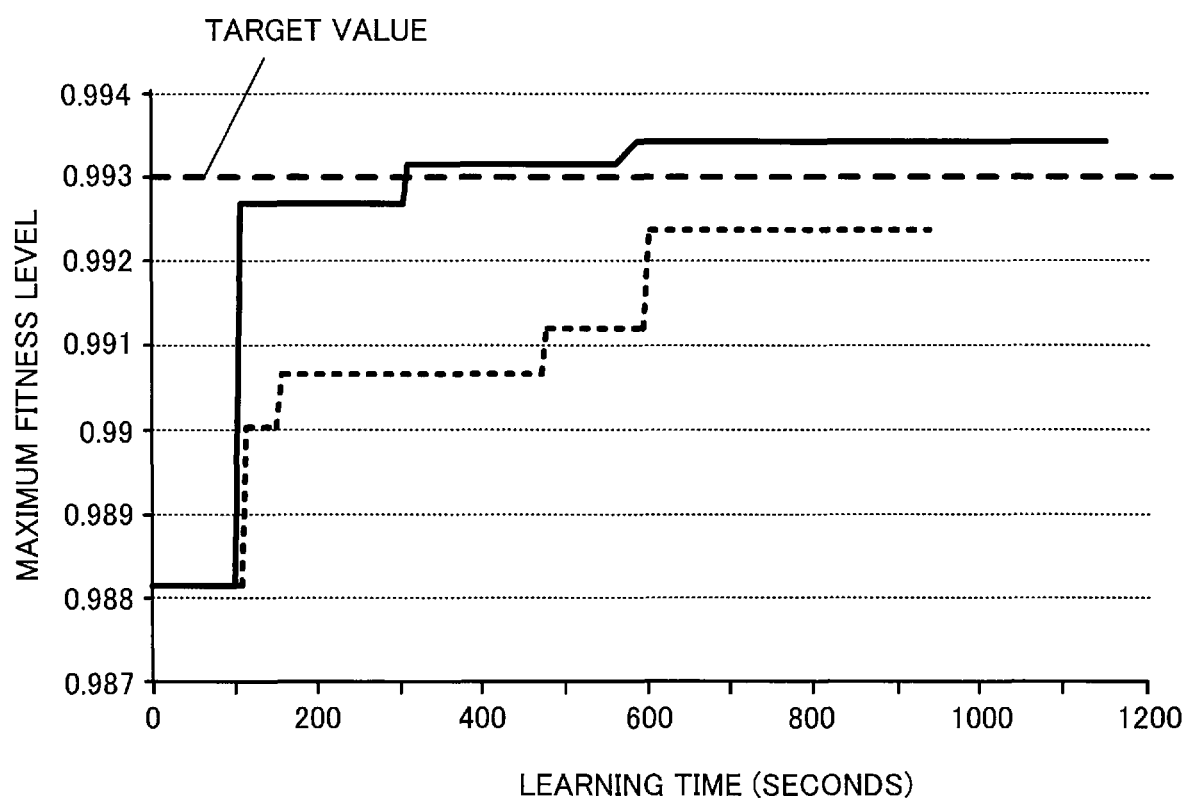
FIG. 12 illustrates an example of changes in the maximum fitness level along with time.

FIG. 12 illustrates an example of changes in the maximum fitness level along with time. While the graph 71 of FIG. 11 represents the changes in the maximum fitness level of the population 31 with respect to the number of generations in the horizontal axis, the graph of FIG. 12 represents the changes in the maximum fitness level of the population 31 with respect to time in the horizontal axis. As seen from FIG. 12, the maximum fitness level reaches a desired target value in a short time by the operation mode being switched according to the increasing rate of the maximum fitness level.

When the operation mode is switched to the increase mode, the number of calculations regarding the fitness levels of child individuals increases with generation. Although an increase in the maximum fitness level per generation is promoted, a longer processing time is needed. However, by setting the operation mode to the increase mode only for limited periods, as illustrated in the graph 72 of FIG. 11, it is possible to reduce the processing time taken for the maximum fitness level to reach the target value.

The following describes modification examples in which part of the processing performed by the image processing apparatus 100 of the second embodiment is modified. The following modification examples will be described using the same reference numerals as used for the image processing apparatus 100 illustrated in FIGS. 7 and 8.

Modification Example 1

In the modification example 1, the image processing apparatus 100 decreases the number of child individuals to be generated in the case where the increasing rate of the maximum fitness level of the population 31 is not improved by increasing the number of child individuals to be generated, as in the increase mode in the second embodiment. Since the number of child individuals generated is decreased, the processing time per generation is reduced, which in turn increases the number of selections of parent individuals and the number of generations of child individuals per unit time. Therefore, the generated child individuals have high variation. That is, the generated child individuals are likely to include a child individual that is close to the correct area 52 in the solution search space 51 illustrated in FIGS. 5A and 5Bd.

In addition, the image processing apparatus 100 increases the number of individuals included in the population 31 in the case where the increasing rate of the maximum fitness level is not improved by decreasing the number of child individuals to be generated.

Figure 13A:
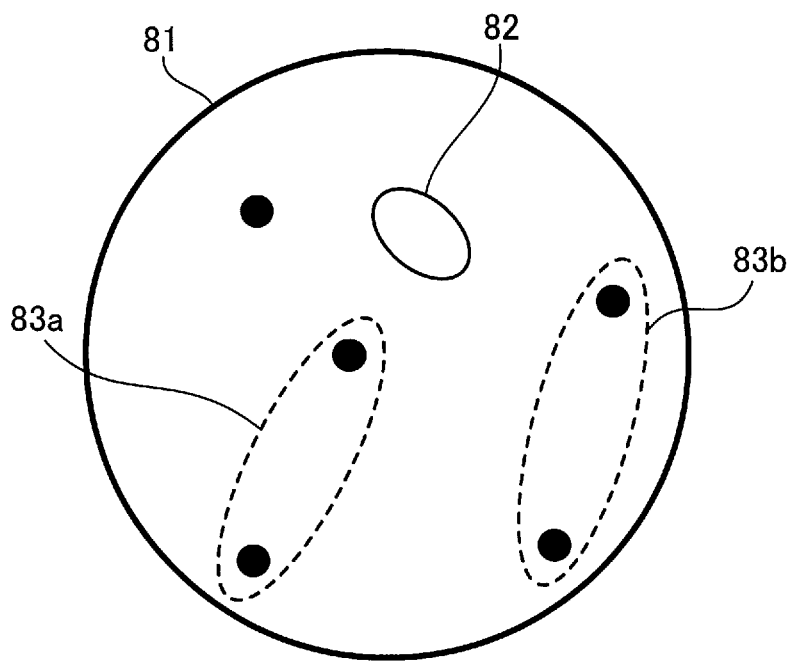
FIGS. 13A and 13B schematically illustrate the relationship between the number of individuals in a population and search area.
Figure 13B:
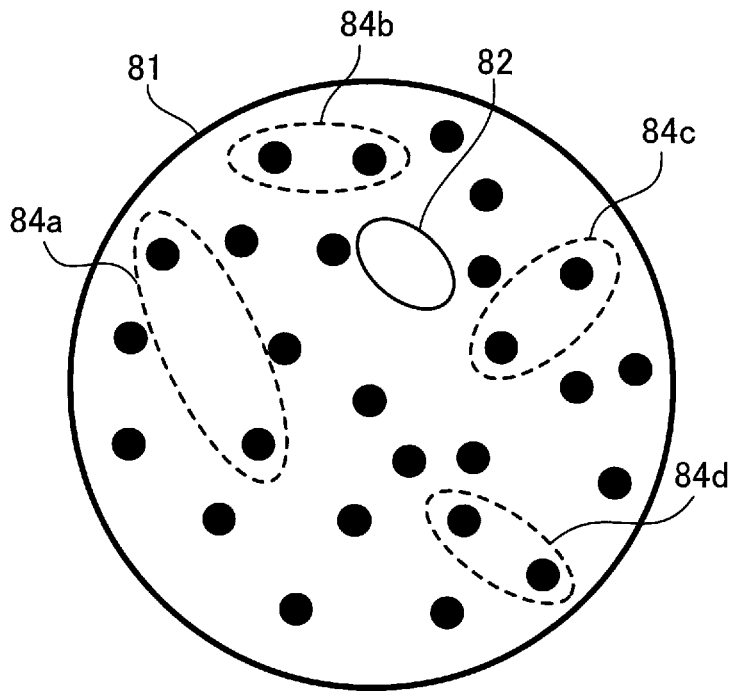

FIGS. 13A and 13B schematically illustrate the relationship between the number of individuals in a population and search area. As with the solution search space 51 illustrated in FIGS. 5A and 5B, the fitness level of each individual in a solution search space 81 illustrated in FIGS. 13A and 13B is represented by how close the individual is to a correct area 82.

FIG. 13A illustrates an example in which a small number of individuals are included in the population 31. Search areas 83a and 83b are each an area covering generated child individuals in the case where a fixed number of child individuals are generated from two certain individuals that are selected from the population 31 including a small number of individuals. FIG. 13B illustrates an example in which a large number of individuals are included in the population 31. Search areas 84a to 84d are each an area covering generated child individuals in the case where a fixed number of child individuals are generated from two certain individuals that are selected from the population 31 including a large number of individuals.

In the case where the population 31 includes a small number of individuals as illustrated in FIG. 13A, there is a high possibility that the parent individuals are not close to the correct area 82. Therefore, there is a low possibility that child individuals close to the correct area 82 are generated in one generation, and thus the learning progresses slowly. In view of this, the number of individuals in the population 31 is increased, as illustrated in FIG. 13B, so that parent individuals located close to the correct area 82 are likely to be selected, and thus an improvement in the learning progress rate is expected.

However, only by increasing the number of individuals in the population 31, the possibility of selecting parent individuals close to the correct area 82 is not always raised. It may take a long time to select parent individuals close to the correct area 82. In view of this, the number of child individuals to be generated is decreased to increase the speed of generational change, in order to select parent individuals close to the correct area 82 in a short time.

In this connection, instead of increasing the number of individuals in the population 31, an individual with a low fitness level among the individuals included in the population 31 may be replaced with a newly generated individual. This makes it possible to raise the possibility of selecting parent individuals close to the correct area 82 and to improve the learning progress rate, without the need of decreasing the number of child individuals to be generated.

Figure 14:
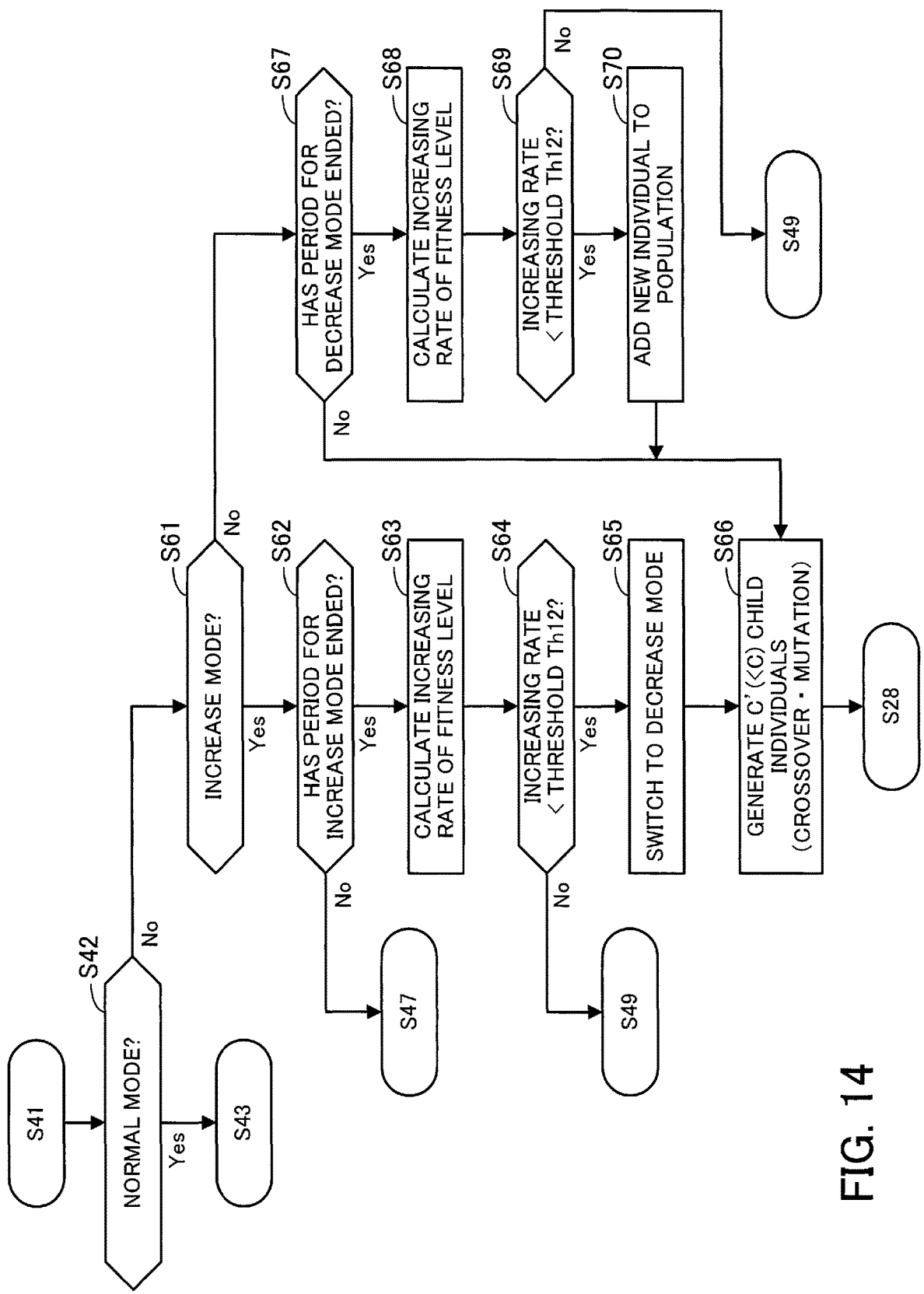
FIG. 14 is a flowchart illustrating an example of a process according to modification example 1.

FIG. 14 is a flowchart illustrating an example of a process according to the modification example 1. As an example, in the process of FIG. 14, not only the normal mode and increase mode, but also a decrease mode is used as an operation mode. In the decrease mode, the number of child individuals to be generated is set to C' that is smaller than the number of child individuals to be generated in the normal mode. The decrease mode is used in the case where the increasing rate of the maximum fitness level of the population 31 does not reach the threshold Th12 after the increase mode is maintained for the aforementioned period D.

In the modification example 1, for example, step S61 of FIG. 14 is executed when it is determined at step S42 of FIG. 10 that the operation mode is not the normal mode.

(Step S61) The learning control unit 121 determines whether the current operation mode is the increase mode. If the current operation mode is the increase mode, step S62 is executed. If the current operation mode is not the increase mode, that is, if it is the decrease mode, step S67 is executed.

(Step S62) The learning control unit 121 determines whether the period for the increase mode has ended. More specifically, if the period set for the increase mode exceeds the aforementioned period D (that is, if the number of repetitions of step S62 after the start of the increase mode exceeds D), the learning control unit 121 determines that the period for the increase mode has ended. If it is determined that the period for the increase mode has ended, step S63 is executed. Otherwise, step S47 of FIG. 10 is executed.

(Step S63) The learning state analysis unit 123 calculates the increasing rate of the maximum fitness level of the population 31 over the past L generations on the basis of the history information stored in the population information storage unit 143 in the same way as in step S44 of FIG. 10.

(Step S64) The learning control unit 121 determines whether the increasing rate calculated at step S63 is lower than the threshold Th12. If the increasing rate is lower than the threshold Th12, step S65 is executed. Otherwise, step S49 of FIG. 10 is executed, where the operation mode is switched to the normal mode.

(Step S65) The learning control unit 121 switches the operation mode from the increase mode to the decrease mode.

(Step S66) The learning control unit 121 generates C' child individuals (here, C'<C) from the two parent individuals selected at step S41 of FIG. 10. Then, step S28 of FIG. 9 is executed.

(Step S67) The learning control unit 121 determines whether the period for the decrease mode has ended. More specifically, if the period set for the decrease mode exceeds the aforementioned period D (that is, the number of repetitions of step S67 after the start of the decrease mode has exceeded D), the learning control unit 121 determines that the period for the decrease mode has ended. If it is determined that the period for the decrease mode has ended, step S68 is executed. Otherwise, step S66 is executed.

(Step S68) The learning state analysis unit 123 calculates the increasing rate of the maximum fitness level of the population 31 over the past L generations on the basis of the history information stored in the population information storage unit 143 in the same way as in step S63.

(Step S69) The learning control unit 121 determines whether the increasing rate calculated at step S68 is lower than the threshold Th12. If the increasing rate is lower than the threshold Th12, step S70 is executed. Otherwise, step S49 of FIG. 10 is executed, where the operation mode is switched to the normal mode. In this connection, in this step S69, a threshold different from the threshold Th12 may be used.

(Step S70) The learning control unit 121 generates a prescribed number of new individuals using the filter set specified at step S22 of FIG. 9. The learning control unit 121 adds the generated individuals to the population 31. To this end, the learning control unit 121 registers the tree structure information on the added individuals and the fitness levels of the individuals in the population information storage unit 143. After that, step S66 is executed with the decrease mode maintained as the operation mode.

In the above-described process of FIG. 14, the increase mode is set only for the period D for promoting an increase in the maximum fitness level, and if the increasing rate of the maximum fitness level does not return to reach the threshold Th12, the operation mode is switched to the decrease mode to decrease the number of child individuals to be generated. By doing so, the processing time per generation is reduced, and the number of selections of parent individuals and the number of generations of child individuals per unit time are increased. Consequently, generated child individuals have high variation. That is, the generated child individuals are likely to include child individuals with high fitness levels.

However, if the increasing rate of the maximum fitness level does not return to reach the threshold Th12 even after the decrease mode is set for the period D, the decrease mode is maintained and new individuals are added to the population 31. This raises the possibility of generating child individuals with high fitness levels in a short time.

In this connection, if the increasing rate is determined to be lower than the threshold Th12 at step S69, the learning control unit 121 may generate a new individual, and replace an individual with a low fitness level among the individuals included in the population 31 with the new individual, without changing the number of individuals in the population 31. In this case, after the replacement of individuals, step S49 of FIG. 10 may be executed, where the operation mode is switched to the normal mode. This also raises the possibility of generating child individuals with high fitness levels in a short time.

In addition, for example, if the operation mode has been switched to the increase mode a prescribed number of times or more by the time when it is determined at step S61 that the period for the increase mode has ended, steps after step S63 may be executed.

Modification Example 2

In the modification example 2, the image processing apparatus 100 increases the number of child individuals to be generated when the fitness levels of generated child individuals have low variation. In the case where the fitness levels of child individuals have low variation, the fitness levels are not likely to increase, meaning that the learning progress may be stagnant. In such a case, by increasing the number of child individuals to be generated, it is possible to promote the learning progress.

In addition, if the variation of the fitness levels of child individuals is changed little by increasing the number of child individuals to be generated, the image processing apparatus 100 decreases the number of child individuals to be generated to be smaller than that set in the normal mode. By doing so, child individuals generated in a unit time have high variation. Therefore, it is likely that the generated child individuals include a child individual that is close to the correct area 52 in the solution search space 51 illustrated in FIGS. 5A and 5B.

Figure 15:
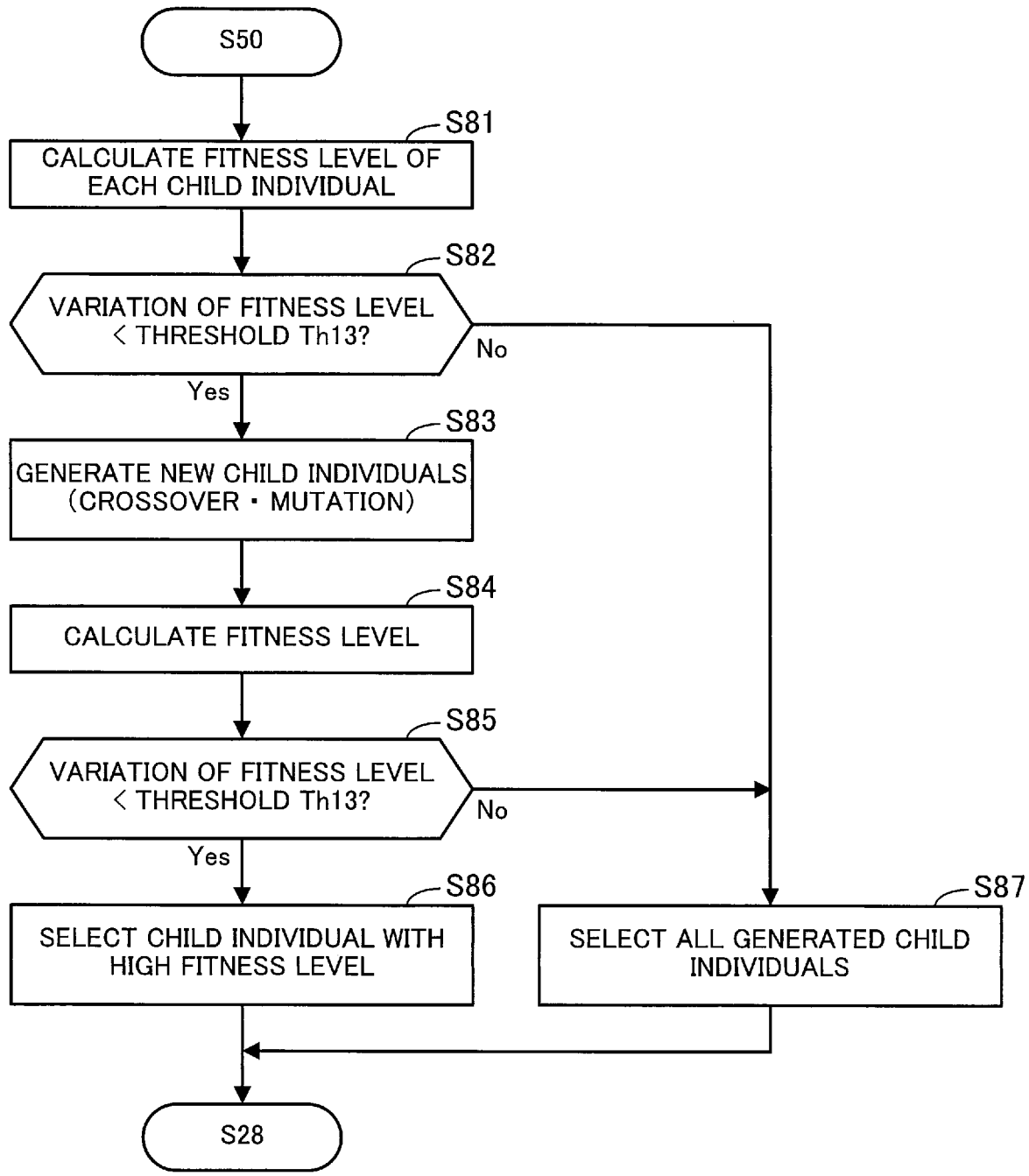
FIG. 15 is a flowchart illustrating an example of a process according to modification example 2.

FIG. 15 is a flowchart illustrating an example of a process according to the modification example 2. In the modification example 2, for example, step S81 is executed after C child individuals are generated at step S50 of FIG. 10.

(Step S81) The fitness level calculation unit 122 calculates the fitness level of each of the C child individuals generated at step S50 in the same way as in step S51 of FIG. 10.

(Step S82) The learning state analysis unit 123 calculates the variation (variance) of the fitness levels calculated at step S81. The learning control unit 121 determines whether the calculated variation is lower than a prescribed threshold Th13. If the variation is lower than the threshold Th13, step S83 is executed. Otherwise, step S87 is executed.

(Step S83) The learning control unit 121 generates a prescribed number of new individuals from two parent individuals selected at step S41 of FIG. 10. For example, (kC−C) individuals are generated.

(Step S84) The fitness level calculation unit 122 calculates the fitness level of each individual generated at step S83 in the same way as in step S51 of FIG. 10.

(Step S85) The learning state analysis unit 123 calculates the variation of fitness level on the basis of all the fitness levels calculated at steps S81 and S84. The learning control unit 121 determines whether the calculated variation is lower than the prescribed threshold Th13. If the variation is lower than the threshold Th13, step S86 is executed. Otherwise, step S87 is executed.

(Step S86) The learning control unit 121 selects a prescribed number of individuals with high fitness levels as individuals to be processed, from the child individuals generated at steps S50 and S83. The number of individuals to be selected here is smaller than the number of child individuals to be generated in the normal mode (i.e., C).

(Step S87) The learning control unit 121 selects all of the individuals generated at steps S50 and S83 as individuals to be processed.

After steps S86 and S87 are executed, step S28 of FIG. 9 is executed. In step S28, the individuals selected to be processed at step S86 or S87 are used as child individuals. In addition, even in the case where steps S29 next to step S28 is executed, the individuals selected to be processed at step S86 or S87 are used as child individuals.

According to the above-described process of FIG. 15, the number of child individuals to be generated is temporarily increased when the variation of the fitness levels of child individuals generated in the normal mode is lower than the threshold Th13, in order to promote the learning progress. In addition, if the variation of the fitness levels of child individuals does not reach the threshold Th13 after the number of child individuals to be generated is increased, the number of child individuals to be used in the subsequent processing is decreased to be smaller than that set in the normal mode, so that child individuals generated in a unit time have high variation. This makes it possible to prevent the learning progress from being stagnant.

Note that in the process at one generation as illustrated in FIG. 15, after child individuals are generated, the number of child individuals is changed according to the variation of the fitness levels of the generated child individuals. Alternatively, the number of child individuals to be generated in the current generation may be changed based on the variation of the fitness levels of child individuals generated at the previous generation.

Further, the above-described process of the modification example 2 may be combined with the process of the modification example 1.

Modification Example 3

In the case where the maximum fitness level of the population 31 reaches a certain level or higher and the reached stage of the learning is a final stage, individuals with high fitness levels are likely to be selected from the population 31, and the learning progress is promoted. In view of this, in the modification example 3, the image processing apparatus 100 removes individuals with low fitness levels from the population 31 when a reached stage of the learning is assumed to be the final stage, in order to reduce the number of individuals in the population 31. By doing so, individuals with high fitness levels are more likely to be selected as parent individuals from the population 31, and the learning progress is promoted.

Figure 16:
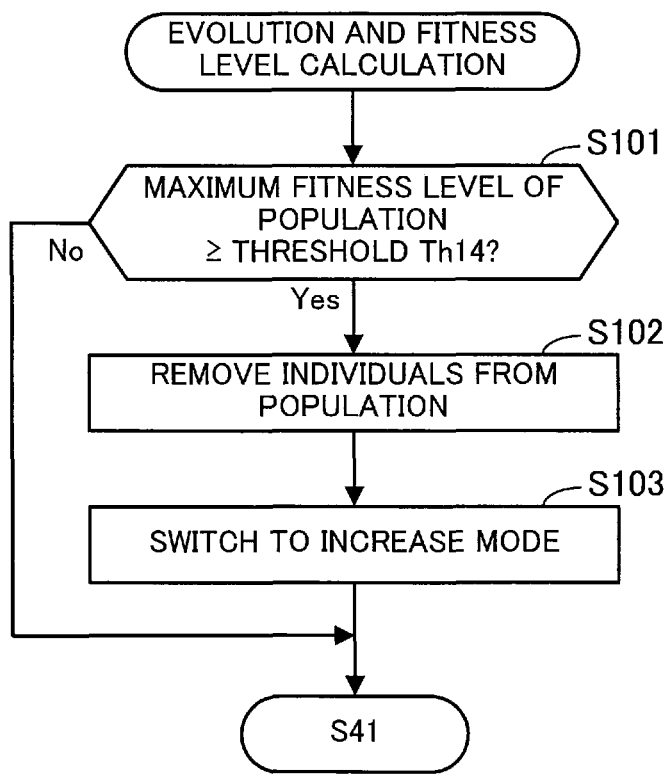
FIG. 16 is a flowchart illustrating an example of a process according to modification example 3.

FIG. 16 is a flowchart illustrating an example of a process according to the modification example 3. In the modification example 3, steps S101 to S103 of FIG. 16 are executed before step S41 of FIG. 10, for example.

(Step S101) The learning control unit 121 determines whether the maximum fitness level of the population 31 is higher than or equal to a prescribed threshold Th14. If the maximum fitness level is higher than or equal to the threshold Th14, step S102 is executed. Otherwise, step S41 of FIG. 10 is executed.

(Step S102) The learning control unit 121 removes a prescribed number of individuals with low fitness levels from the population 31.

(Step S103) The learning control unit 121 switches the operation mode to the increase mode.

In the above-described process of FIG. 16, when the maximum fitness level of the population 31 reaches the threshold Th14 or higher, the number of individuals in the population 31 is reduced, and the operation mode is switched to the increase mode to increase the number of child individuals to be generated. By increasing the number of child individuals to be generated under a situation where parent individuals with high fitness levels are likely to be selected, an increase in the fitness levels of child individuals is expected, and the learning progress is further promoted.

In this connection, the above-described process of the modification example 3 may be combined with the processes of the modification examples 1 and 2.

Modification Example 4

In the case where the fitness levels of individuals included in the population 31 have low variation, no individuals may exist in the vicinity of a correct area. In this case, the maximum fitness level of the population 31 is not likely to increase. At the final stage of the learning, however, the maximum fitness level of the population 31 is already high, and therefore there is a high possibility that some individuals in the population 31 exist in the vicinity of the correct area.

In view of this, in the modulation example 4, when the fitness levels of the individuals included in the population 31 have low variation at the initial stage of the learning, the image processing apparatus 100 adds new individuals to the population 31 to increase the number of individuals in the population 31. By doing so, individuals with high fitness levels are likely to be selected as parent individuals, and the learning progress is promoted.

Figure 17:
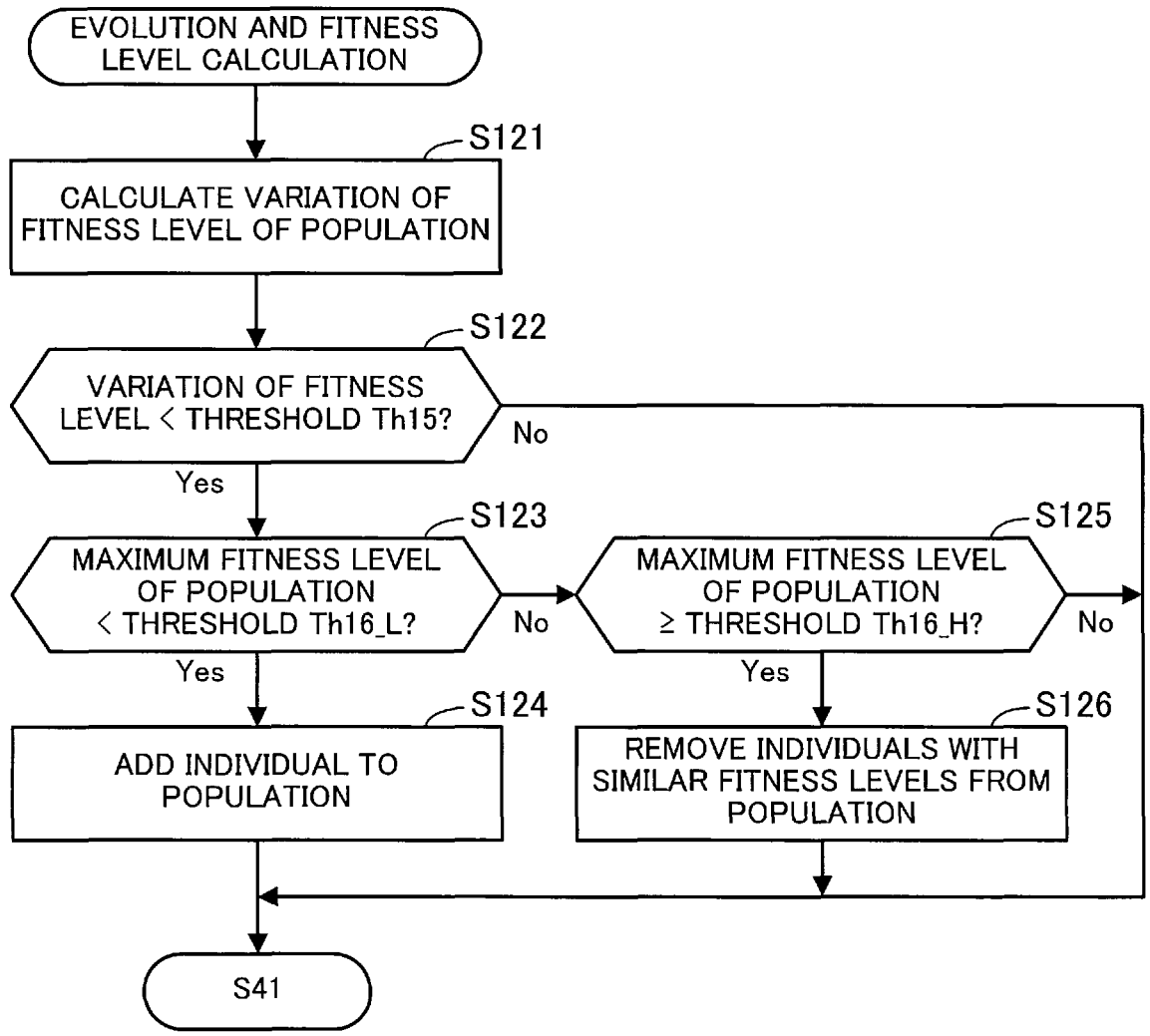
FIG. 17 is a flowchart illustrating an example of a process according to modification example 4.

FIG. 17 is a flowchart illustrating an example of a process according to the modification example 4. In the modification example 4, steps S121 to S126 of FIG. 17 are executed before step S41 of FIG. 10, for example.

(Step S121) The learning state analysis unit 123 calculates the variation (variance) of fitness levels of individuals included in the population 31.

(Step S122) The learning control unit 121 determines whether the variation calculated at step S121 is lower than a prescribed threshold Th15. If the variation is lower than the threshold Th15, step S123 is executed. Otherwise, step S41 of FIG. 10 is executed.

(Step S123) The learning control unit 121 determines whether the maximum fitness level of the population 31 is smaller than a prescribed threshold Th16_L. If the maximum fitness level is smaller than the threshold Th16_L, step S124 is executed. Otherwise, step S125 is executed.

(Step S124) The learning control unit 121 generates a prescribed number of new individuals using the filter set specified at step S22 of FIG. 9 in the same way as in step S70 of FIG. 14, and adds the generated individuals to the population 31. After that, step S41 of FIG. 10 is executed.

(Step S125) The learning control unit 121 determines whether the maximum fitness level of the population 31 is higher than or equal to a prescribed threshold Th16_H. This threshold Th16_H is set to be higher than the threshold Th16_L used at step S123. If the maximum fitness level is higher than or equal to the threshold Th16_H, step S126 is executed. Otherwise, step S41 of FIG. 10 is executed.

In this connection, step S123 and S125 may be modified in such a manner that, for example, step S124 is executed if the maximum fitness level is lower than a certain threshold, and step S126 is executed if the maximum fitness level is higher than or equal to the certain threshold.

(Step S126) The learning control unit 121 reduces the number of individuals included in the population 31 so as to exclude individuals with similar fitness levels from the population 31. For example, the learning control unit 121 identifies a pair of individuals whose fitness levels have a difference smaller than or equal to a prescribed threshold, in the population 31, and removes one of the paired individuals from the population 31. After that, step S41 of FIG. 10 is executed.

In the above-described process of FIG. 17, if the fitness levels of the individuals in the population 31 are determined to have low variation at step S122, the learning stage is judged at step S123 and S125. If the learning stage is determined to be the initial stage, new individuals are added to the population 31 at step S124. By doing so, individuals with high fitness levels are likely to be selected as parent individuals, and the learning progress is promoted.

On the other hand, in the example of FIG. 17, if the learning stage is determined to be the final stage, one of paired individuals with similar fitness levels is removed from the population 31 at step S126. Since the number of individuals in the population 31 is reduced, all of the individuals in the population 31 are likely to be selected as parent individuals in a short time. In addition, since one of paired individuals with high fitness levels is removed, the variation of the fitness levels of individuals selected as parent individuals in each generation is high. Because of these two effects, optimal individuals are more likely to be selected as parent individuals from the individuals of the population 31 in a short time, and the learning progress is promoted.

In this connection, for example, step S126 may be executed in such a manner that a pair of individuals with similar tree structures is identified from the individuals included in the population 31, and one of the paired individuals is removed from the population 31. The similarity of tree structures is calculated based on the number of nodes included in a tree structure and the similarity of kinds of image filters assigned to respective nodes, for example. Even in the case where such a process is performed, optimal individuals are likely to be selected as parent individuals from the individuals in the population 31 in a short time, and the learning progress is promoted.

Further, the above-described process of the modification example 4 may be combined with the processes of the modification examples 1 and 2.

Modification Example 5

In the case where the fitness levels of two parent individuals selected from the population 31 have low variation, a search area per generation in a solution search area becomes narrow. In view of this, in the modification example 5, the image processing apparatus 100 increases the number of child individuals to be generated when the fitness levels of parent individuals have low variation. By doing so, child individuals close to a correct area are likely to be generated, and the learning progress is promoted.

Figure 18:
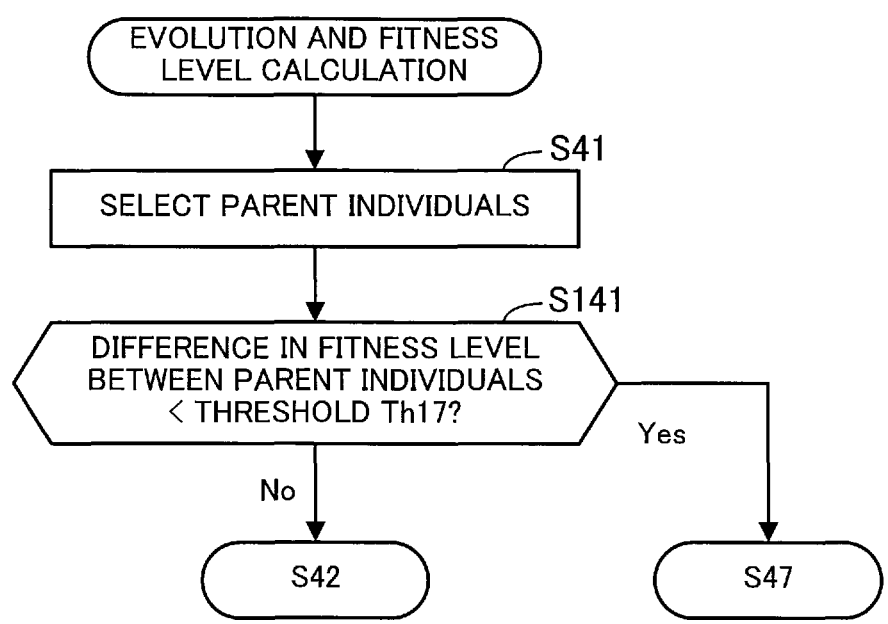
FIG. 18 is a flowchart illustrating an example of a process according to modification example 5.

FIG. 18 is a flowchart illustrating an example of a process according to the modification example 5. In the modification example 5, step S141 is executed after two parent individuals are selected at step S41 of FIG. 10, for example.

(Step S141) The learning state analysis unit 123 calculates a difference in fitness level between the parent individuals selected at step S41. The learning control unit 121 determines whether the calculated difference is smaller than a prescribed threshold Th17. If the difference is greater than or equal to the threshold Th17, step S42 of FIG. 10 is executed. If it is determined that the difference is smaller than the threshold Th17 and the fitness levels of the parent individuals have low variation, step S47 of FIG. 10 is executed to temporarily increase the number of child individuals to be generated.

In this connection, step S141 of FIG. 18 may be executed if the increase in the maximum fitness level of the population 31 by switching to the increase mode is not sufficient. For example, when the number of switches to the increase mode exceeds a prescribed threshold, the image processing apparatus 100 calculates the increasing rate of the maximum fitness level of the population 31 after the execution of step S41. The image processing apparatus 100 executes step S141 only if the increasing rate is lower than a prescribed threshold, and skips step S141 and executes step S42 if the increasing rate is higher than or equal to the threshold.

In this connection, the above-described process of the modification example 5 may be combined with the processes of the modification examples 1 to 4.

Modification Example 6

In the modification example 6, the number of child individuals to be generated is controlled according to the sizes of the tree structures of parent individuals selected from the population 31. The size of a tree structure indicates the number of nodes included in the tree structure, for example.

The larger the size of tree structure of a parent individual, the higher the variation of child individuals generated from the parent individual. Therefore, the fitness levels of the child individuals are likely to be high. In view of this, in the modification example 6, the image processing apparatus 100 increases the number of child individuals to be generated when the sizes of the tree structures of parent individuals are large, in order to further promote the learning progress.

When the sizes of tree structures of parent individuals are small, however, child individuals, even if generated by performing a crossover operation between these parent individuals, are likely to be similar to each other. That is, the learning progress rate decreases. In view of this, in the modification example 6, the image processing apparatus 100 decreases the number of child individuals to be generated to be smaller than that set in the normal mode when the tree structures of parent individuals are small, so as to select new parent individuals in a short time. This prevents the learning progress from being stagnant.

Figure 19:
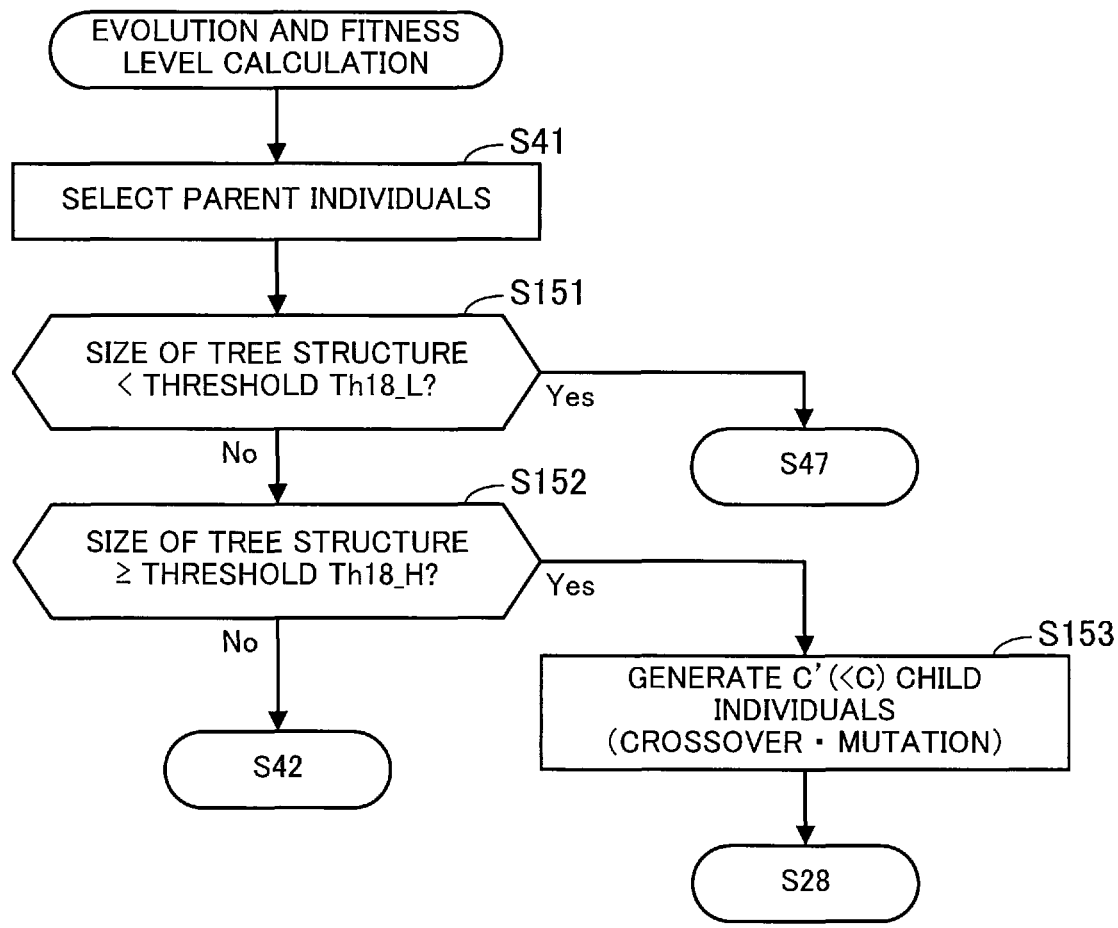
FIG. 19 is a flowchart illustrating an example of a process according to modification example 6.

FIG. 19 is a flowchart illustrating an example of a process according to the modification example 6. In the modification example 6, the following process is performed after two parent individuals are selected at step S41 of FIG. 10, for example.

(Step S151) The learning control unit 121 compares the size of each tree structure of the parent individuals selected at step S41 with a prescribed threshold Th18_L. If at least one of the sizes of the tree structures is smaller than the threshold Th18_L, step S47 of FIG. 10 is executed, where the number of child individuals to be generated is temporarily increased to kC. If both of the sizes of the tree structures are larger than or equal to the threshold Th18_L, step S152 is executed.

(Step S152) The learning control unit 121 compares the size of each tree structure of the parent individuals selected at step S41 with a prescribed threshold Th18_H. This threshold Th18_H is set to be higher than the threshold Th18_L. If at least one of the sizes of the tree structures is larger than or equal to the threshold Th18_H, step S153 is executed. If both of the sizes of the tree structures are smaller than the threshold Th18_H, step S42 of FIG. 10 is executed.

(Step S153) The learning control unit 121 generates C' child individuals that are fewer than the number of child individuals to be generated in the normal mode (that is, C), from the two parent individuals selected at step S41. That is, if at least one of the sizes of the tree structures of the parent individuals is larger than or equal to the threshold Th18_L, the number of child individuals to be generated is temporarily increased. After that, step S28 of FIG. 9 is executed.

In this connection, the determinations of steps S151 and S152 of FIG. 19 may be made in the case where the increase in the maximum fitness level of the population 31 by switching to the increase mode is not sufficient. For example, if the number of switches to the increase mode exceeds a prescribed threshold, the image processing apparatus 100 calculates the increasing rate of the maximum fitness level of the population 31 after the execution of step S41. The image processing apparatus 100 executes step S151 only when the increasing rate is lower than the prescribed threshold, and skips steps S151 and S152 and executes step S42 when the increasing rate is higher than or equal to the threshold.

In this connection, the above-described process of the modification example 6 may be combined with the processes of the modification examples 1 to 5.

The processing functions of each of the apparatuses (program generation apparatus 1 and image processing apparatus 100) in the above-described embodiments may be implemented by using a computer. In this case, a program describing the processing content of the functions implemented by each apparatus is provided. The processing functions are implemented by causing the computer to run the program. The program describing the processing content may be recorded on a computer-readable recording medium. Computer-readable recording media include magnetic storage devices, optical discs, magneto-optical recording media, semiconductor memories, and others. Magnetic storage devices include Hard Disk Drives (HDD), Flexible Disks (FD), magnetic tapes, and others. Optical discs include Digital Versatile Discs (DVD), DVD-RAMs, Compact Disc-Read Only Memories (CD-ROM), CD-Rs (Recordable), CD-RWs (rewritable), and others. Magneto-optical recording media include Magneto-Optical disks (MO) and others.

To distribute the program, for example, portable recording media, such as DVDs and CD-ROMs, on which the program is recorded may be put on sale. Alternatively, the program may be stored in a storage device of a server computer, and may be transferred from the server computer to other computers over a network.

A computer that runs the program may store the program recorded on a portable recording medium or the program received from the server computer in a local storage device. Then, the computer reads the program from the local storage device, and performs processing according to the program. In this connection, the computer may read the program directly from the portable recording medium, and then perform processing according to the program. Alternatively, the computer may perform processing according to the program while receiving the program from the server computer over a network.

According to one aspect, it is possible to reduce the time taken to generate an image processing program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program generation apparatus using genetic programming, the program generation apparatus comprising:
    a memory configured to store therein information on a population including a plurality of individuals and a fitness level of each of the plurality of individuals included in the population, the plurality of individuals each being an image processing program that is represented by a tree structure; and
    a processor configured to perform a procedure including
      a setting process of calculating an increasing rate of a maximum fitness level among fitness levels of the plurality of individuals included in the population, setting a setting value to a first value when the increasing rate is higher than or equal to a first threshold, and setting the setting value to a second value when the increasing rate is lower than the first threshold, the setting value indicating a number of child individuals to be generated, the second value being greater than the first value,
      an evolution process of generating as many child individuals as specified by the setting value, based on a parent individual selected from the plurality of individuals included in the population, the child individuals being different from the parent individual, and
      a survival selection process of obtaining a fitness level of the parent individual from the memory, calculating a fitness level of each of the child individuals, selecting an individual with a highest fitness level from the parent individual and the child individuals, updating the population by replacing one of the plurality of individuals included in the population with the selected individual, and registering the fitness level of the selected individual in the memory,
    wherein the setting process, the evolution process, and the survival selection process are repeatedly performed, and
    after performing the survival selection process, the setting process calculates the increasing rate of the maximum fitness level among fitness levels of updated individuals included in the updated population, and the evolution process generates the child individuals based on the parent individual selected from the updated individuals included in the updated population.

2. The program generation apparatus according to claim 1, wherein
    the setting of the setting value to the first value is maintained while the setting process is performed a first number of times after the increasing rate becomes the first threshold or higher, and
    the setting of the setting value to the second value is maintained while the setting process is performed a second number of times after the increasing rate falls below the first threshold, the second number of times being smaller than the first number of times.

3. The program generation apparatus according to claim 2, wherein the setting process includes setting the setting value to a third value when the increasing rate is lower than a third threshold after the setting process is performed the second number of times, during which the setting of the setting value to the second value is maintained, the third value being smaller than the first value.

4. The program generation apparatus according to claim 1, wherein the procedure further includes changing the setting value, based on variation of the fitness levels of the child individuals generated in the evolution process.

5. The program generation apparatus according to claim 1, wherein the procedure further includes, when the maximum fitness level is higher than or equal to a fourth threshold, removing an individual with a lowest fitness level from the population and increasing the setting value.

6. The program generation apparatus according to claim 1, wherein the setting process includes changing the setting value, based on variation of the fitness level of the parent individual.

7. The program generation apparatus according to claim 1, wherein the setting process includes changing the setting value, based on a size of a tree structure representing the parent individual.

8. The program generation apparatus according to claim 1, wherein the procedure further includes changing a number of individuals included in the population, based on the maximum fitness level when variation of the fitness levels of the plurality of individuals in the population is lower than a fifth threshold.

9. A program generation method using genetic programming, the method causing a computer to perform a procedure comprising:
    a setting process of calculating an increasing rate of a maximum fitness level among fitness levels of a plurality of individuals included in a population, with reference to a memory, setting a setting value to a first value when the increasing rate is higher than or equal to a first threshold, and setting the setting value to a second value when the increasing rate is lower than the first threshold, the memory storing therein information on the population including the plurality of individuals and a fitness level of each of the plurality of individuals included in the population, the plurality of individuals each being an image processing program that is represented by a tree structure, the setting value indicating a number of child individuals to be generated, the second value being greater than the first value;
    an evolution process of generating as many child individuals as specified by the setting value, based on a parent individual selected from the plurality of individuals included in the population, the child individuals being different from the parent individual; and
    a survival selection process of obtaining a fitness level of the parent individual from the memory, calculating a fitness level of each of the generated child individuals, selecting an individual with a highest fitness level from the parent individual and the child individuals, updating the population by replacing one of the plurality of individuals included in the population with the selected individual, and registering the fitness level of the selected individual in the memory, wherein the setting process, the evolution process, and the survival selection process are repeatedly performed and after performing the survival selection process, the setting process calculates the increasing rate of the maximum fitness level among fitness levels of updated individuals included in the updated population, and the evolution process generates the child individuals based on the parent individual selected from the updated individuals included in the updated population.

10. A non-transitory computer-readable recording medium storing a generation program for generating a program using genetic programming, the generation program causing a computer to perform a procedure comprising:

a setting process of calculating an increasing rate of a maximum fitness level among fitness levels of a plurality of individuals included in a population, with reference to a memory, setting a setting value to a first value when the increasing rate is higher than or equal to a first threshold, and setting the setting value to a second value when the increasing rate is lower than the first threshold, the memory storing therein information on the population including the plurality of individuals and a fitness level of each of the plurality of individuals included in the population, the plurality of individuals each being an image processing program that is represented by a tree structure, the setting value indicating a number of child individuals to be generated, the second value being greater than the first value;

an evolution process of generating as many child individuals as specified by the setting value, based on a parent individual selected from the plurality of individuals included in the population, the generated child individuals being different from the parent individual; and a survival selection process of obtaining a fitness level of the parent individual from the memory, calculating a fitness level of each of the generated child individuals, selecting an individual with a highest fitness level from the parent individual and the child individuals, updating the population by replacing one of the plurality of individuals included in the population with the selected individual, and registering the fitness level of the selected individual in the memory, wherein the setting process, the evolution process, and the survival selection process are repeatedly performed, and after performing the survival selection process, the setting process calculates the increasing rate of the maximum fitness level among fitness levels of the updated individuals included in the updated population, and the evolution process generates the child individuals based on the parent individual selected from the updated individuals included in the updated population.

* * * * *